United States Patent

Supino et al.

Patent Number: 5,825,582
Date of Patent: *Oct. 20, 1998

[54] SLIDING MODE CONTROL OF A DISK DRIVE ACTUATOR FOR POSITIONING A READ/WRITE HEAD OVER A SELECTED TRACK DURING SEEKING AND TRACKING OPERATIONS

[75] Inventors: Louis Supino; Paul M. Romano, both of Bouder, Colo.

[73] Assignee: Cirrus Logic, Inc., Fremont, Calif.

[ * ] Notice: The terminal 8 months of this patent has been disclaimed.

[21] Appl. No.: 435,416

[22] Filed: May 10, 1995

Related U.S. Application Data

[63] Continuation of Ser. No. 400,073, Mar. 7, 1995, abandoned.
[51] Int. Cl.$^6$ ............................................. G11B 5/596
[52] U.S. Cl. .................................. 360/78.06; 360/78.04; 360/78.14; 360/77.02; 318/568.18; 318/671
[58] Field of Search ........................ 360/78.06, 78.09, 360/78.11, 78.14, 77.01, 77.02, 77.05; 318/568.17, 568.18, 619, 671, 679; 369/44.28, 44.36

[56] References Cited

U.S. PATENT DOCUMENTS

| | | | |
|---|---|---|---|
| 4,679,103 | 7/1987 | Workman | 360/78.14 |
| 4,713,596 | 12/1987 | Bose | 318/802 |
| 5,276,387 | 1/1994 | Gamble | 318/135 |
| 5,341,078 | 8/1994 | Torri et al. | 318/568.22 |
| 5,345,348 | 9/1994 | Suzuki | 360/78.06 X |
| 5,442,270 | 8/1995 | Tetsuaki | 318/568.22 |

FOREIGN PATENT DOCUMENTS

| | | |
|---|---|---|
| 0 013 326 | 7/1980 | European Pat. Off. . |
| 44 05 087 | 8/1994 | Germany . |

OTHER PUBLICATIONS

Chandrasekhar Namuduri and Paresh C. Sen, "A Servo–Control System Using a Self–Controlled Synchronous Motor (SCSM) With Sliding Mode Controller", *IEEE Trans. on Industry Applications*, vol. IA–23, No. 2, Mar./Apr. 1987.

John Y. Hung, Weibing Gao, and James C, Hung, "Variable Structure Control: A Survey", *IEEE Trans. on Industrial Electronics*, vol. 40, No. 1, Feb. 1993.

Katsuhisa Furuta, "Sliding Mode Control of a Discrete System", *Systems & Control Letters*, vol. 14, No. 2, Feb. 1990.

J. C. Hung, "Chattering Handling for Variable Structure Control Systems", *Proceedings of the IECON '93*, vol. 3, 1993.

(List continued on next page.)

*Primary Examiner*—Aristotelis M. Psitos
*Assistant Examiner*—Larry T. Cullen
*Attorney, Agent, or Firm*—Howard H. Sheerin; Dan A. Shifrin

[57] ABSTRACT

A sliding mode controller is disclosed for controlling the motion of a read/write head actuated by a voice coil motor over a rotating magnetic disk storage medium. The magnetic disk comprises a plurality of concentric data tracks recorded thereon wherein each data track comprises user data and servo data. The sliding mode controller operates by multiplying a head position error phase state and a head position error velocity phase state by respective switching gains to force the phase states to follow a predetermined phase state trajectory. The phase state trajectory can be defined by a single linear segment, a variable linear segment, multiple linear segments over the entire region of excursion, or optimum parabolic acceleration and deceleration segments. Switching logic, responsive to the phase states and a trajectory segment value σ, switches between positive and negative feedback gains to drive the phase states toward a current trajectory segment. A σ processing block monitors the phase states to determine when to switch from a current trajectory segment to the next trajectory segment. The resulting servo control system is relatively inexpensive to implement in either software or hardware, and it is substantially insensitive to parametric changes and external load disturbances. Further, it does not require notch filters commonly used in conventional linear controllers to compensate for mechanical resonances.

38 Claims, 14 Drawing Sheets

OTHER PUBLICATIONS

Raymond A. DeCarlo, Stanislaw H. Zak, and Gregory Mathews, "Variable Structure Control of Nonlinear Multivariable Systems: A Tutorial", *Proceedings of the IEEE*, vol. 76, No. 3, Mar. 1988.

V.I. Utkin, "Discontinous Control System: State of Art In Theory and Applications", *Automatic Contol World Congress* 1987, vol. 1.

Weibing Gao and James C. Hung, "Variable Structure Control of Nonlinear Systems: A New Approach", *IEEE Trans. on Industrial Electronics*, vol. 40, No. 1, Feb. 1993.

M.A. El–Sharkawi, "Development and Implementation of High Performance Variable Structure Tracking Control for Brushless Motors", *IEEE/PES 1990 Summer Meeting*, Mineapolis, minnesota, Jul. 15–19, 1990.

G.C. Verghese, B. Fernandez R., and J.K. Hedrick, "Stable, Robust Tracking by Sliding Mode Control", *Systems & Control Letters*, vol. 10, 1988.

Kar–Keung D. Young and Harry G. Kwatny, "Variable Structure Sevomechanism Design and Applications to Overspeed Protection Control", *1982 International Federation of Automatic Control*.

B. K. Bose, "Sliding Mode Control of Induction Motor", CH2207–9/85/0000–0479 IEEE (1985).

"Sliding Mode Control For Arrivals and Small Movement" IBM Technical Disclosure Bulletin, vol. 23, No. 4, (1990).

SLIDING MODE CONTROL OF A DISK DRIVE ACTUATOR FOR POSITIONING A READ/WRITE HEAD OVER A SELECTED TRACK DURING SEEKING AND TRACKING OPERATIONS

RELATED APPLICATIONS

This application is a continuation of U.S. patent application Ser. No. 08/400,073 filed Mar. 7, 1995.

FIELD OF INVENTION

The present invention relates to computer technology and, more specifically, to controlling the read/write head actuator in a disk drive.

BACKGROUND OF THE INVENTION

In magnetic disk storage systems, a transducing head writes digital data onto a magnetic storage medium. The digital data serves to modulate the current in a read/write head coil so that a sequence of corresponding magnetic flux transitions are written onto the magnetic medium in a series of concentric data tracks. To read this recorded data, the read/write head passes over the magnetic medium and transduces the magnetic transitions into pulses in an analog signal. These pulses are then decoded by read channel circuitry to reproduce the digital data.

The read/write head is normally mounted on an actuator arm which is positioned by means of a voice coil motor (VCM). A servo system controls the VCM, and thereby the head position, necessary for reading and writing information in response to requests from a computer to which the disk drive is connected. The servo system performs two functions: (1) a "seek" or "access" function in which the servo system moves the head to a selected track; and (2) when the head reaches the selected track, the servo system commences a "track following" or "tracking" function in which it accurately positions the head over a centerline of the track and maintains that position as successive portions of the track pass by the head. Servo control information embedded within the data provides inter-track head position information so that a head position error, indicative of a difference between the estimated head position and the desired head position, can be computed. In response to the head position error, the servo control system generates a VCM control signal to align the head over the centerline of the selected track, thereby driving the head position error to zero.

Conventional servo systems are typically linear controllers employing Proportional-Integral-Derivative (PID) feedback or state estimators. The problem with these types of linear controllers, however, is they are sensitive to parametric variations in the VCM control system and to external load disturbances. Conventional adaptive linear controllers overcome these sensitivity problems by continuously re-programming the controller to compensate for the parameter variations and load disturbances. Although adequate, adaptive control systems can be overly complex and expensive to implement. Further, adaptive linear controllers also require notch filters to compensate for mechanical resonances. What is needed is a low cost, less complex solution to the sensitivity and resonance problems inherent in the control of a disk drive actuator.

"Bang-bang" control law is yet another conventional method suggested by the prior art for controlling the actuator position in a disk drive (e.g., see C. Denis Mee and Eric D. Daniel, "Magnetic Recording Volume II: Computer Data Storage", McGraw-Hill, Inc., 1988, pp. 64–65). In this type of control system, the motor command signal switches between maximum positive acceleration and maximum negative deceleration in response to a velocity error input signal. The goal is to force the actuator velocity to follow a predetermined trajectory as the actuator moves toward a target track. "Bang-bang" control systems, however, are not used in the prior art because of an inherent "chatter" problem caused by rapidly switching between the maximum positive and negative values. Chattering causes large amounts of undesirable system noise. Additionally, the control near the target alternates between the most positive and negative values yielding poor tracking results. There is, therefore, a need for a disk drive actuator control system that can minimize switching noise and provide adequate tracking performance.

SUMMARY OF THE INVENTION

In the present invention, a spin motor rotates a magnetic disk under a read/write head. Recorded on the magnetic disk are several concentric data tracks having servo information embedded thereon. Read channel circuitry, connected to the read/write head, decodes the digitally recorded data and transmits the servo data to a state estimator. The state estimator processes the servo data to generate an actuator position signal that is subtracted from a reference actuator position to generate an actuator position error signal. A sliding mode controller, responsive to the actuator position error signal, switches between positive and negative feedback gains (rather than maximum positive and negative values as in "bang-bang" control) in order to generate a motor control signal. The motor control signal is amplified and applied to a VCM connected to one end of an actuator having the read/write head attached to the other end. The VCM controls the motion of the actuator in order to position the read/write head over a selected track.

The sliding mode controller is defined by two phase states: an actuator position error phase state and a actuator position error velocity phase state. The actuator position error phase state is the difference between an estimated actuator position and a desired actuator position (e.g., the difference between a current track the read/write head is positioned over and a selected new track). The actuator position error velocity phase state is the rate of change of the actuator position error and can be generated by differentiating the actuator position error or by a state estimator. The position error velocity is also the negative velocity of the actuator.

By switching between positive and negative feedback gains, the sliding mode controller operates to drive the phase states toward a predetermined phase plane trajectory. The sliding mode controller is, therefore, a function of the phase states rather than the physical characteristics of the disk drive, and the control system is substantially insensitive to parametric variations and external load disturbances. Further, the notch filters in conventional linear controllers used to compensate for mechanical resonances are not necessary in the sliding mode controller of the present invention. The control system is relatively simple and inexpensive to implement, and there is a well defined method for proving global stability.

In the preferred embodiment, the phase plane trajectory is defined by four segments: a substantially parabolic acceleration segment that defines an acceleration of the actuator toward the selected track; a linear constant velocity segment that defines a constant velocity of the actuator toward the selected track; a substantially parabolic deceleration segment that defines a deceleration of the actuator toward the selected track and a linear tracking segment that defines a tracking mode of the actuator.

The sliding mode controller comprises switching logic, responsive to the phase states, for switching between the positive and negative feedback modes wherein the switching logic operates according to the current trajectory segment being followed by the phase states. The sliding mode controller further comprises a σ processing block, also responsive to the phase states, for controlling the operating mode of the switching logic by determining which trajectory segment σ the phase states are to follow.

In order to reduce noise caused by switching between the negative and positive feedback gains, the sliding mode controller generates the motor control signal using only the actuator position error velocity phase state during seek operations. This reduces the magnitude of the control signal, and thereby the amount of switching in the system, but also requires an initial error velocity reference signal to start the actuator moving in the correct direction. Once the actuator substantially reaches the selected track, the sliding mode controller switches to a tracking mode and generate the motor control signal using both the actuator position error and actuator position error velocity phase states. The actuator position error is also integrated and added to the motor control signal in order to drive the steady state error to zero.

In an alternative embodiment, the sliding mode controller is responsive to an actuator position error, velocity error, and acceleration phase states. The velocity error is generated by subtracting an estimated velocity from a reference velocity, where the reference velocity is computed as a function of the actuator position error.

DETAILED DESCRIPTION OF THE DRAWINGS

Figure 1:
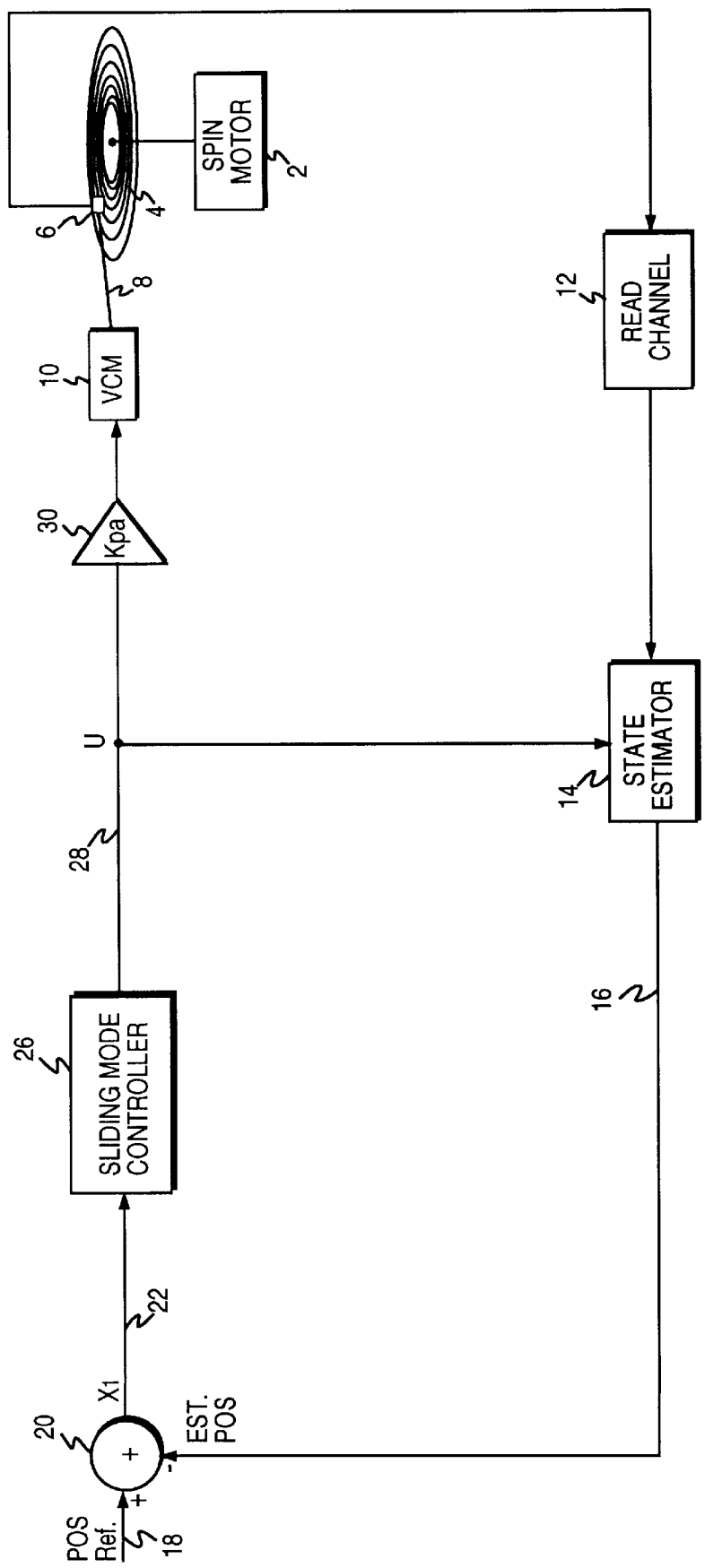
FIG. 1 is a block diagram of the disk drive control system of the present invention.

FIG. 1 is an overview of the disk drive control system of the present invention. A spin motor 2 spins a magnetic disk 4 with computer data recorded thereon under a read/write head 6. An actuator 8 positions the read/write head 6 over a selected track, and a Voice Coil Motor (VCM) 10 controls the motion of the actuator 8. Read channel circuitry 12, connected to receive the analog signal from the read/write head 6, decodes the digital data recorded on the magnetic disk and transmits servo information to a state estimator 14. The state estimator 14 models the VCM control system in order to generate an estimated actuator position 16 that is subtracted from a reference actuator position 18 at adder 20 to produce an actuator position error $X_1$ 22. The reference actuator position 18 is the position of a selected track at which data is to be written or read. A sliding mode controller 26, responsive to the actuator position error $X_1$ 22, computes an acceleration motor control signal U 28, amplified by amplifier 30, and applied to the VCM 10 to position the read/write head over the selected track. The state estimator 14 also processes the motor control signal U 28 to generate the estimated actuator position 16.

The state estimator 14 filters out errors in the servo position information caused by noise in the recording channel. In the embodiment of the sliding mode controller shown in FIG. 6, the state estimator 14 can also replace the differentiator 102 in order to generate the actuator position error velocity phase state X2. State estimators are well known in the prior art such as described in U.S. Pat. No. 4,679,103, the disclosure of which is hereby expressly incorporated by reference. There are also other well known techniques other than state estimators for generating the actuator phase states for use by the present invention.

Figure 2A:
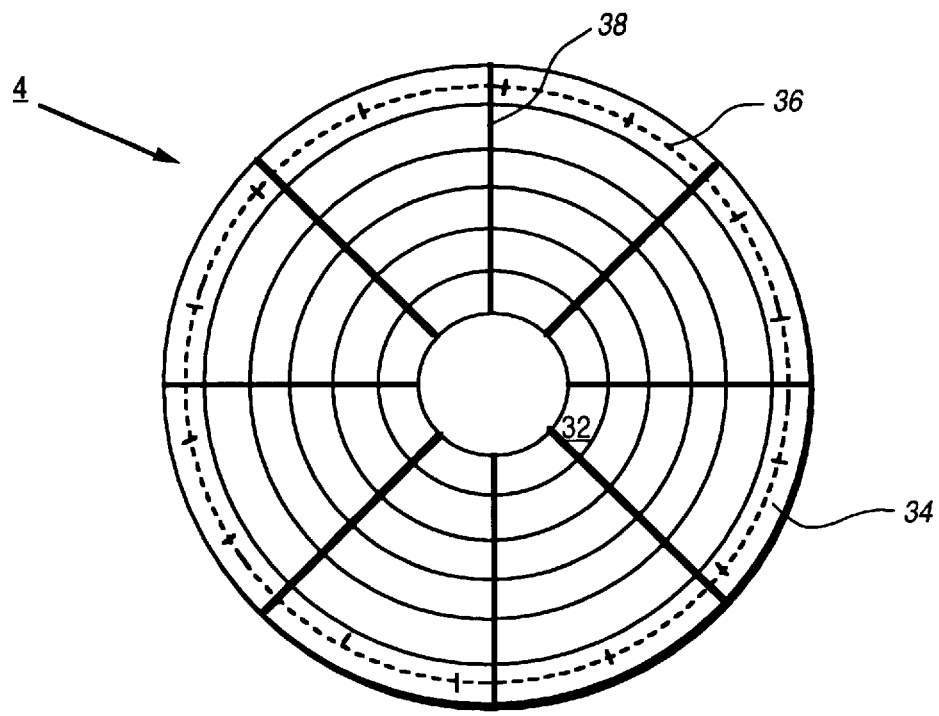
FIG. 2A and 2B show an example data format of a magnetic disk comprising a plurality of concentric data tracks with embedded servo fields.
Figure 2B:
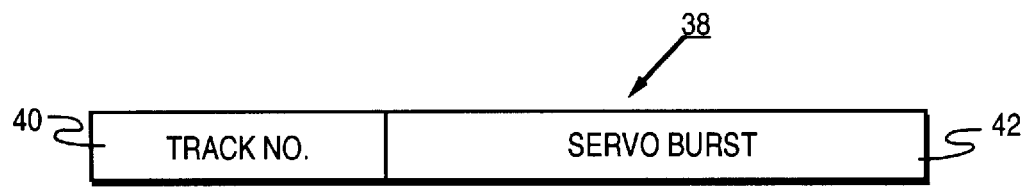

Referring now to FIGS. 2A and 2B, shown is an exemplary data format of the magnetic disk 4 comprising a plurality of concentric data tracks with an inner data track 32 and an outer data track 34. As shown in FIG. 2A, each data track comprises a plurality of sectors 36 and a plurality of servo fields 38 embedded therein. The servo fields 38 comprise track number information 40 processed by the state estimator 14 to generate the estimated actuator position 16 while seeking the selected track. Once the read/write head slows to within a predetermined velocity as it approaches the selected track, the state estimator 14 processes the track number 40 and the servo burst information 42 in the servo fields to align the head over the centerline of the selected track while writing and reading data. Servo bursts comprise a plurality of pulses recorded at precise locations adjacent to the track centerline. The magnitude of these servo burst pulses sensed by the read/write head indicates the off track position of the head.

Figure 3A:
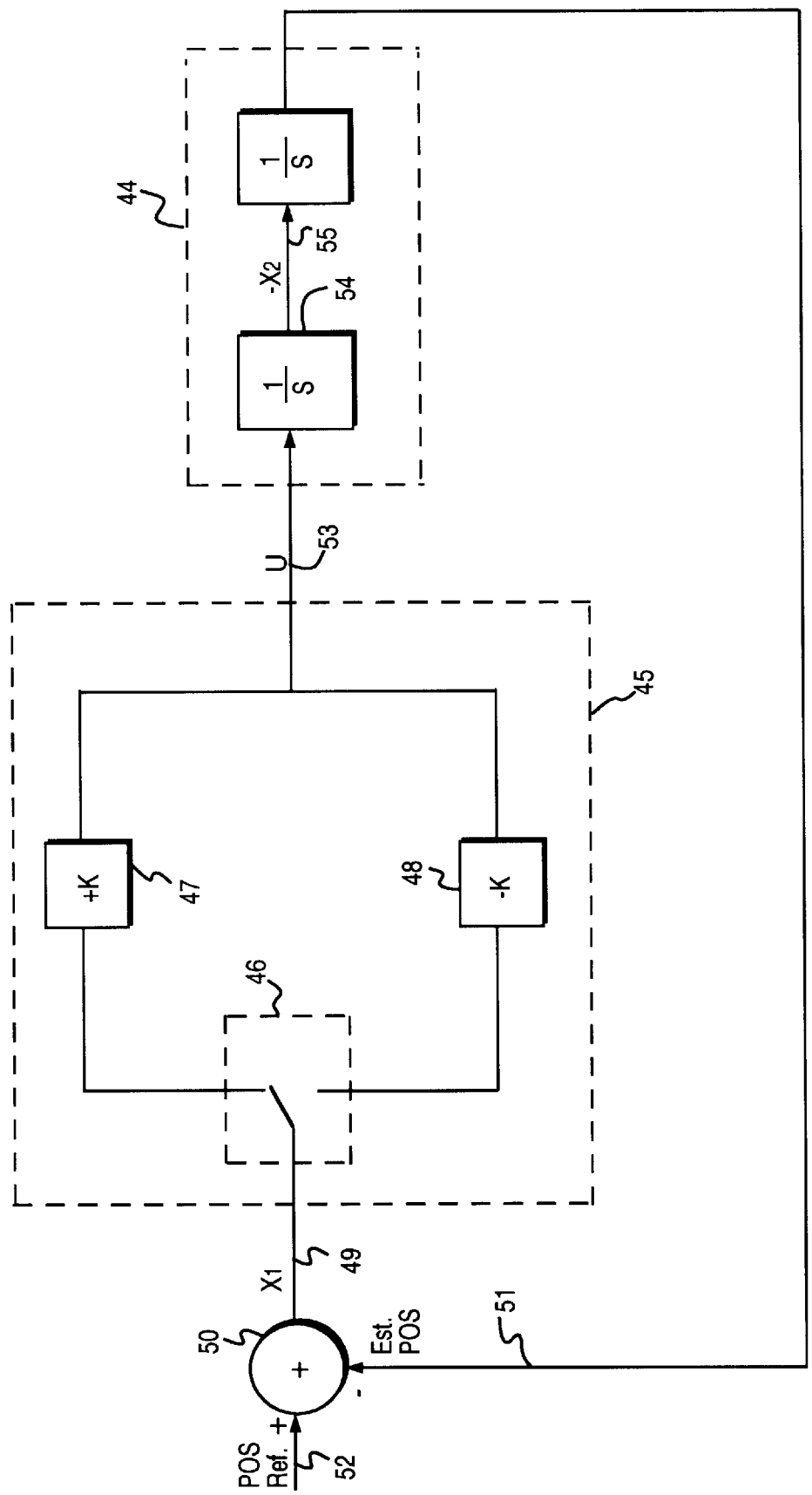
FIG. 3A shows an example second order system controlled by an example sliding mode controller.

Operation of the sliding mode controller 26 is understood with reference to FIG. 3A. Shown is an example second order system 44 controlled by an example sliding mode controller 45 that switches 46 between a positive gain 47 and negative gain 48 not necessarily equal in magnitude. A position error $X_1$ 49 is generated at the output of adder 50 by subtracting an estimated position 51 of the controlled system from a desired position reference command 52. The position error $X_1$ 49 is multiplied by the positive gain 47 or the negative gain 48 depending on the state of switch 46 to generate an acceleration command U 53 as the input to the controlled system 44. The output of integrator 54 is the velocity of the controlled system 44 which is also the negative of the position error velocity $-X_2$ 55. When switch 46 selects the positive gain 47, it is a negative feedback system, and when switch 46 selects the negative gain 48, it is a positive feedback system. In their individual structures the system is unstable. However, the system can be made stable by repeatedly switching between the two structures.

The state space equation in negative feedback is:

$$\frac{dX1}{dt} = X2 \quad (1)$$

$$\frac{dX2}{dt} = -KX1$$

The general solution to equation (1) is:

$$X_1 = A \sin(Kt+\phi) \quad (2)$$

$$X_2 = \sqrt{K}A \cos(Kt+\phi) \quad (3)$$

Combining equations (2) and (3), $$\frac{X1^2}{A^2} + \frac{X2^2}{KA^2} = 1 \quad (4)$$

Figure 3B:
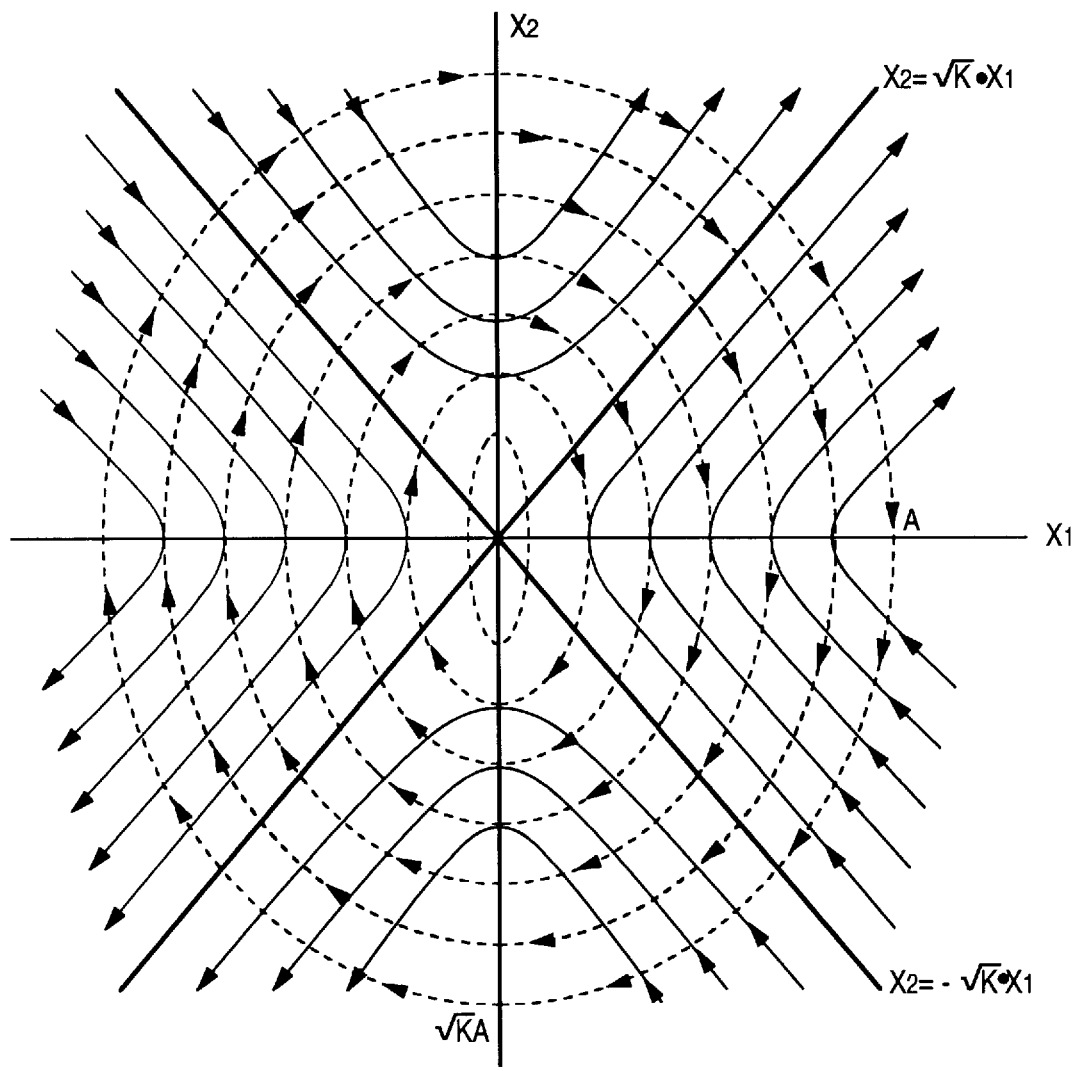
FIG. 3B are the phase plane plots for the position error and error velocity phase states for the positive and negative feedback modes of the control system shown in FIG. 3A.

The phase plane plot of equation (4) is a set of ellipses with eccentricities A and $\sqrt{K}A$ as illustrated in FIG. 3B.

The state space equation in positive feedback is:

$$\frac{dX1}{dt} = X2 \quad (5)$$

$$\frac{dX2}{dt.} = +KX1$$

The solution to equation (5) is:

$$X_1 = B_{1e}{}^{\sqrt{K}t} + B_{2e}{}^{-\sqrt{K}t} \quad (6)$$

$$X_2 = \sqrt{K}B_{1e}{}^{\sqrt{K}t} - KB_{2e}{}^{-\sqrt{K}t}$$

Combining equations (5) and (6), $$\frac{X1^2}{4B1B2} - \frac{X2^2}{4KB1B2} = 1 \quad (7)$$

The phase plane plot of equation (7) is a set of hyperbolas with two asymptotes as shown in FIG. 3B.

The two individual phase plane trajectories of equations (4) and (7) result in an unstable system since the phase states never reach the origin. It is possible, however, to reach the origin by driving the phase states along a third phase trajectory defined at the intersection of the negative and positive feedback trajectories. This is achieved by switching between the positive and negative gains in response to the current phase state values so that the phase states follow the predetermined third phase trajectory.

Figure 3C:
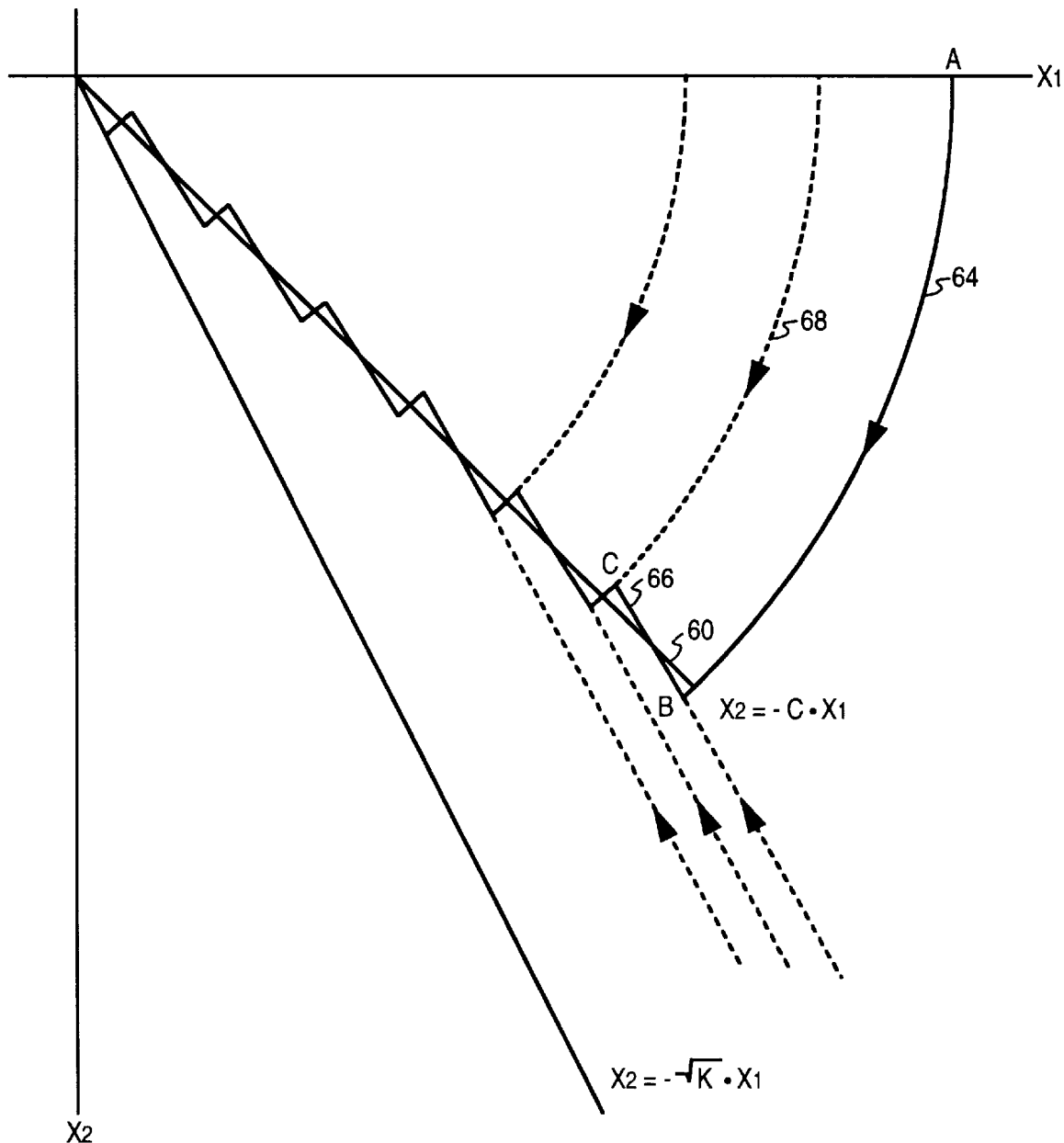
FIG. 3C illustrates the operation of the sliding mode controller in driving the phase states toward a predetermine linear phase trajectory during a forward seek to a new track.

The switching operation is understood with reference to FIG. 3C where the predetermined third phase trajectory is shown as a linear segment 60. When a new track is selected, the initial actuator position error is at point A, and the control system is initially switched to select the positive gain (i.e., negative feedback). As the actuator begins to accelerate toward the selected track, the phase states follow the arc trajectory 64 of the negative feedback mode. When the phase states reach the beginning of the third phase trajectory 60 at the intersection point B, the sliding mode controller switches to the negative gain and the phase states begin to follow the hyperbola trajectory 66 of the positive feedback mode. When the phase states cross the third phase trajectory 60 at point C, the controller switches back to the positive gain to drive the phase states along arc 68 back toward the third phase trajectory 60. This switching action is repeated so that the phase states slide along the linear segment 60 toward the origin of the phase plane. When the phase states are within a predetermined minimum distance from the origin of the phase plane, the system switches to a tracking mode where the sliding mode controller 26 repeatedly switches between positive and negative feedback in order to keep the phase states near the origin of the phase plane, thereby keeping the read/write head 6 aligned over the centerline of the selected track.

The time domain response of the control system when the phase states follow the sliding line of FIG. 3C is:

$$X_1(t) = X_1(t1)e^{-C(t-t1)} \quad (8)$$

where t1 is the time when the phase states reach the sliding line at point B. Equation (8) is the average response of the system along the sliding line and it is substantially unaffected by variations in the parameter K or by external load disturbances. Consequently, it is not necessary to know the exact parameters of the system in order to determine the value for K. Equation (8), together with the existence Equation (11) below, prove that the system is globally stable within the sliding mode region.

The sliding mode controller determines when to switch between the positive and negative gains by observing the phase state values. The linear phase trajectory of FIG. 3C is defined by:

$$X_2 = -C \cdot X_1 \quad (9)$$

where the constant C is the slope of the linear segment 60. By observing the phase states, the sliding mode controller switches the gains so that:

$$\sigma = X_2 + C \cdot X_1 = 0. \quad (10)$$

The sliding mode controller switches to the positive gain when $\sigma \cdot X_1 > 0$ and to the negative gain when $\sigma \cdot X_1 < 0$ in order to drive the phase states toward the linear trajectory.

The overall response of the system is made faster by increasing the slope of the sliding line (i.e., increasing C). However, an important limitation in sliding mode control is that the third phase trajectory must be constrained to a region in the phase plane where the positive and negative feedback phase trajectories intersect in opposite directions. From FIG. 3C it follows that the slope of the sliding line must be constrained to $0 < C < \sqrt{K}$. A further relationship derived from this constraint is:

$$\lim_{\sigma \to 0} \sigma \cdot \frac{d\sigma}{dt} < 0. \quad (11)$$

Equation (11) is known as the existence equation and is used to determine values for the positive and negative gains.

Figure 3D:
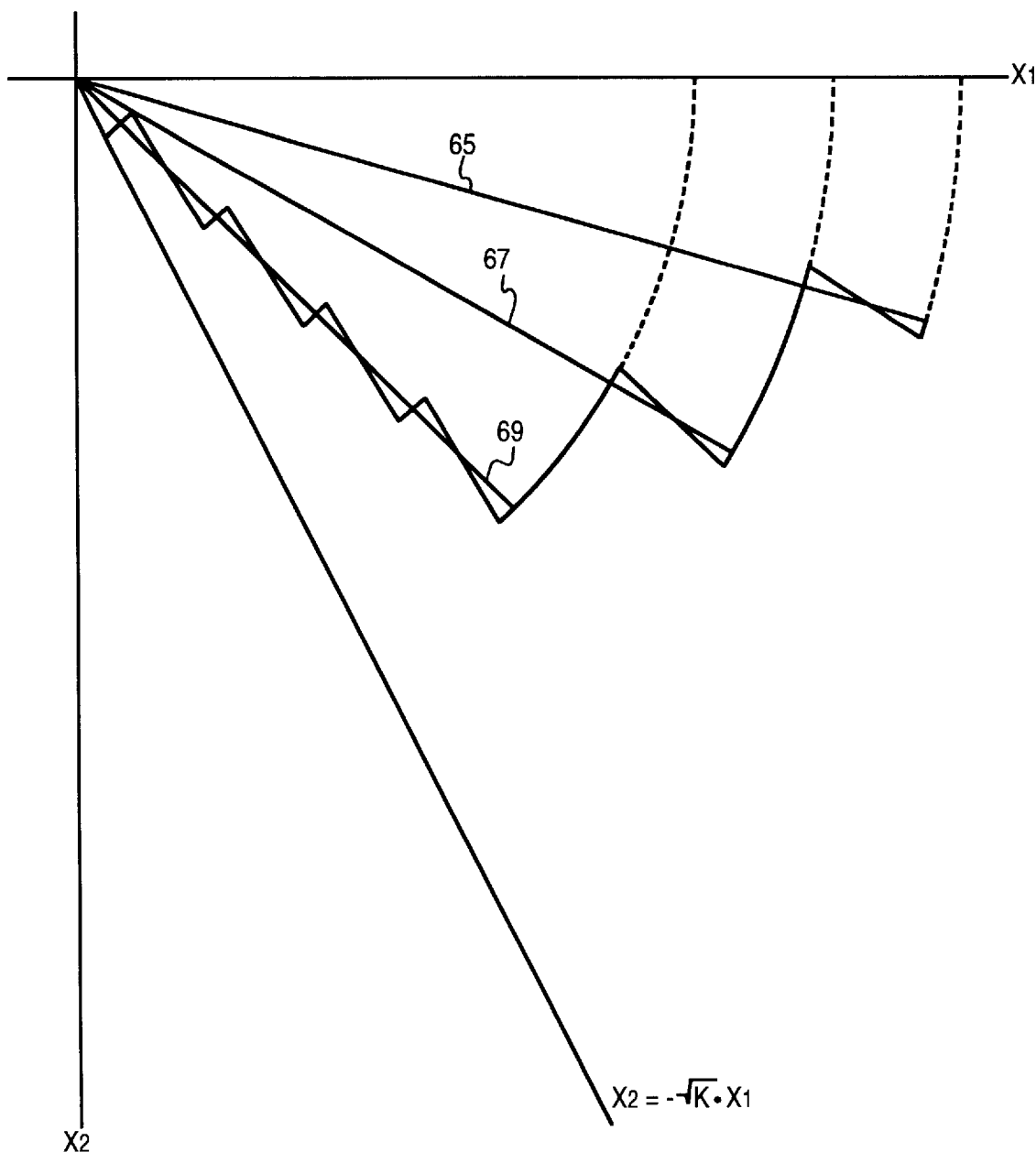
FIG. 3D illustrates the affect of changing the elope of the linear phase trajectory in FIG. 3C in order to extend the sliding mode.

The linear sliding mode trajectory 60 of FIG. 3C has the disadvantage in that it initially operates in a linear feedback mode, and the initial arc trajectory 64 may drift due to parameter variation and external load disturbance. This problem is reduced by extending the sliding mode region of operation. For instance, a phase trajectory adjustor can continuously adjust the slope of the linear segment as shown in FIG. 3D. After the phase states reach the first sliding line 65 and follow it for a predetermined amount of time, the phase trajectory adjustor increases the slope to sliding line 67 by increasing the constant C. The system operates in a linear mode (non-sliding mode) only during the inter-segment transitions. Eventually, the slope is increased to a predetermine maximum at sliding line 69 at which point the phase states slide along line 69 toward the origin of the phase plane.

Figure 3E:
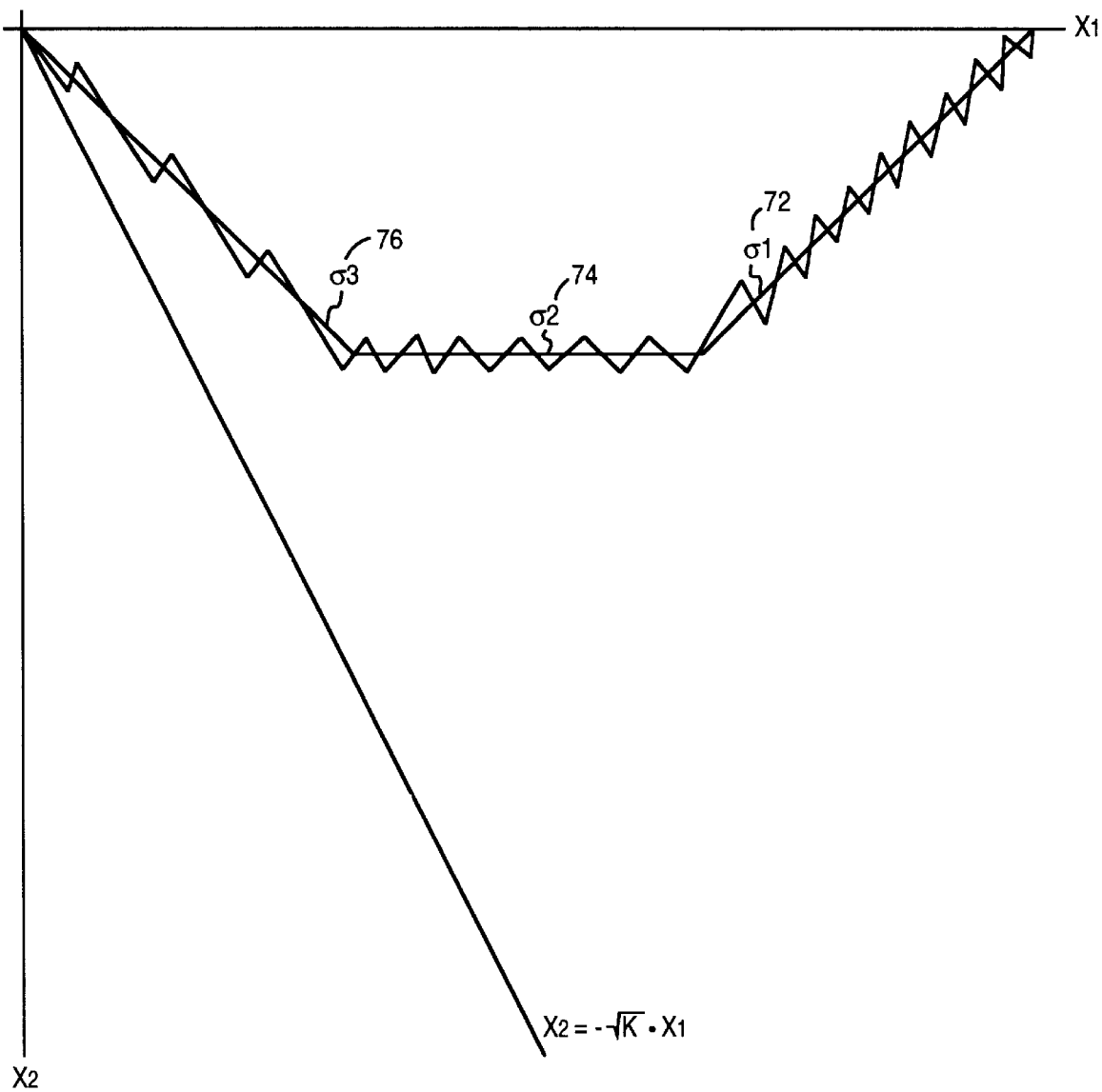
FIG. 3E illustrates a phase plane trajectory which covers the whole region of excursion thereby eliminating any linear mode of operation that may be sensitive to parameter variations.

A more robust implementation is to define a phase trajectory to cover the entire region of excursion. This is illustrated in FIG. 3E where the phase trajectory is comprised of three linear segments $\sigma_1$ 72, $\sigma_2$ 74, and $\sigma_3$ 76:

$$\sigma_1 = X_2 - C_1 \cdot (X_1 - X_I);$$

$$\sigma_2 = X_2 - X_{2I}; \text{ and} \tag{12}$$

$$\sigma_3 = X_2 + C_2 \cdot X_1; \text{ where:}$$

$X_1$=the actuator position error phase state;
$X_2$=the actuator position error velocity phase state;
$C_1$=the slope of the first segment;
$C_2$=the slope of the third segment;
$X_I$=an initial actuator position error; and
$X_{2I}$=a predetermined constant position error velocity. The first linear segment $\sigma_1$ 72 represents an acceleration of the actuator 8, the second linear segment $\sigma_2$ 74 represents a constant velocity of the actuator 8, and the third segment $\sigma_3$ 76 represents a deceleration of the actuator 8 toward the selected track.

As described above, $C_2$ is constrained to $0 < C_2 < \sqrt{K}$, but all three segments are also constrained by the maximum acceleration, constant velocity, and deceleration limits of the VCM 10. Once the phase trajectory is selected to be within the physical limitations of the VCM, the controller operates substantially independent of parameter variations and external load disturbances.

Figure 4:
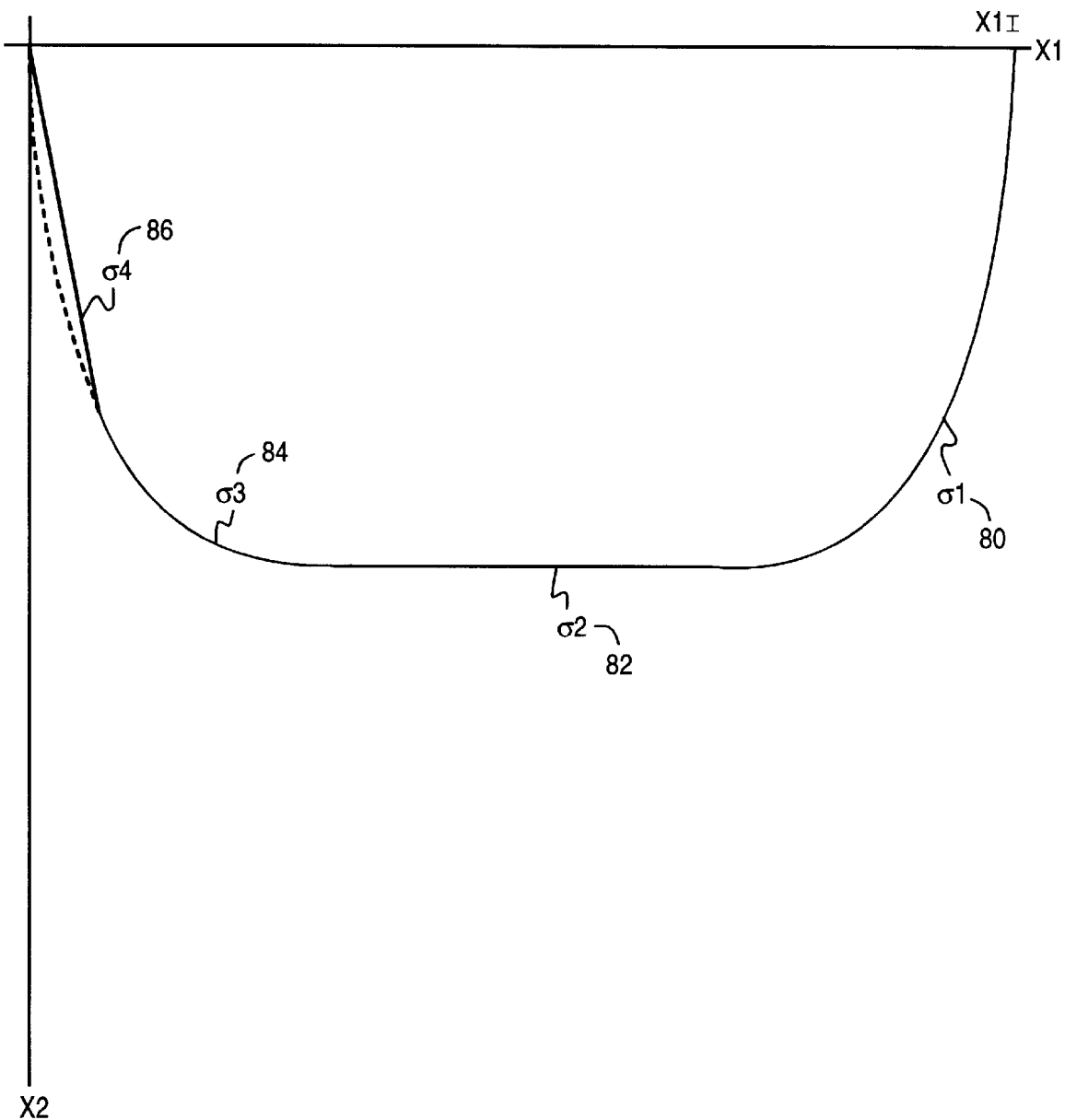
FIG. 4 illustrates the preferred phase plane trajectory of the present invention.

The optimum phase plane trajectory, and the preferred embodiment of the present invention, is illustrated in FIG. 4. This trajectory comprises a substantially parabolic acceleration segment $\sigma_1$ 80, a linear constant velocity segment $\sigma_2$ 82, a second substantially parabolic deceleration segment $\sigma_3$ 84, and a linear deceleration segment $\sigma_4$ 86:

$$\sigma_1 = C_1 \cdot X_2^2 + X_1 - X_{1I}; \tag{13}$$

$$\sigma_2 = X_2 - X_{2I}; \tag{14}$$

$$\sigma_3 = -C_2 \cdot X_2^2 + X_1; \tag{15}$$

$$\sigma_4 = X_2 + C_3 \cdot X_1; \text{ where:} \tag{16}$$

$X_1$=the actuator position error phase state;
$X_2$=the actuator position error velocity phase state;
$C_1$=a predetermined acceleration constant;
$X_{1I}$=an initial actuator position error;
$X_{2I}$=a predetermined constant position error velocity;
$C_2$=a predetermined deceleration constant; and
$C_3$=a predetermined slope of the linear deceleration segment. The linear deceleration segment $\sigma_4$ 86 is necessary because the slope of the parabolic deceleration segment $\sigma_3$ 84 becomes too steep near the origin to support sliding mode (i.e., the deceleration becomes too large). The linear constant velocity segment $\sigma_2$ 82 is not necessary if the inter-track seek distance is sufficiently short (i.e., the phase states will transition from $\sigma_1$ directly to $\sigma_3$ if the initial position error is less than a predetermined threshold).

Figure 5:
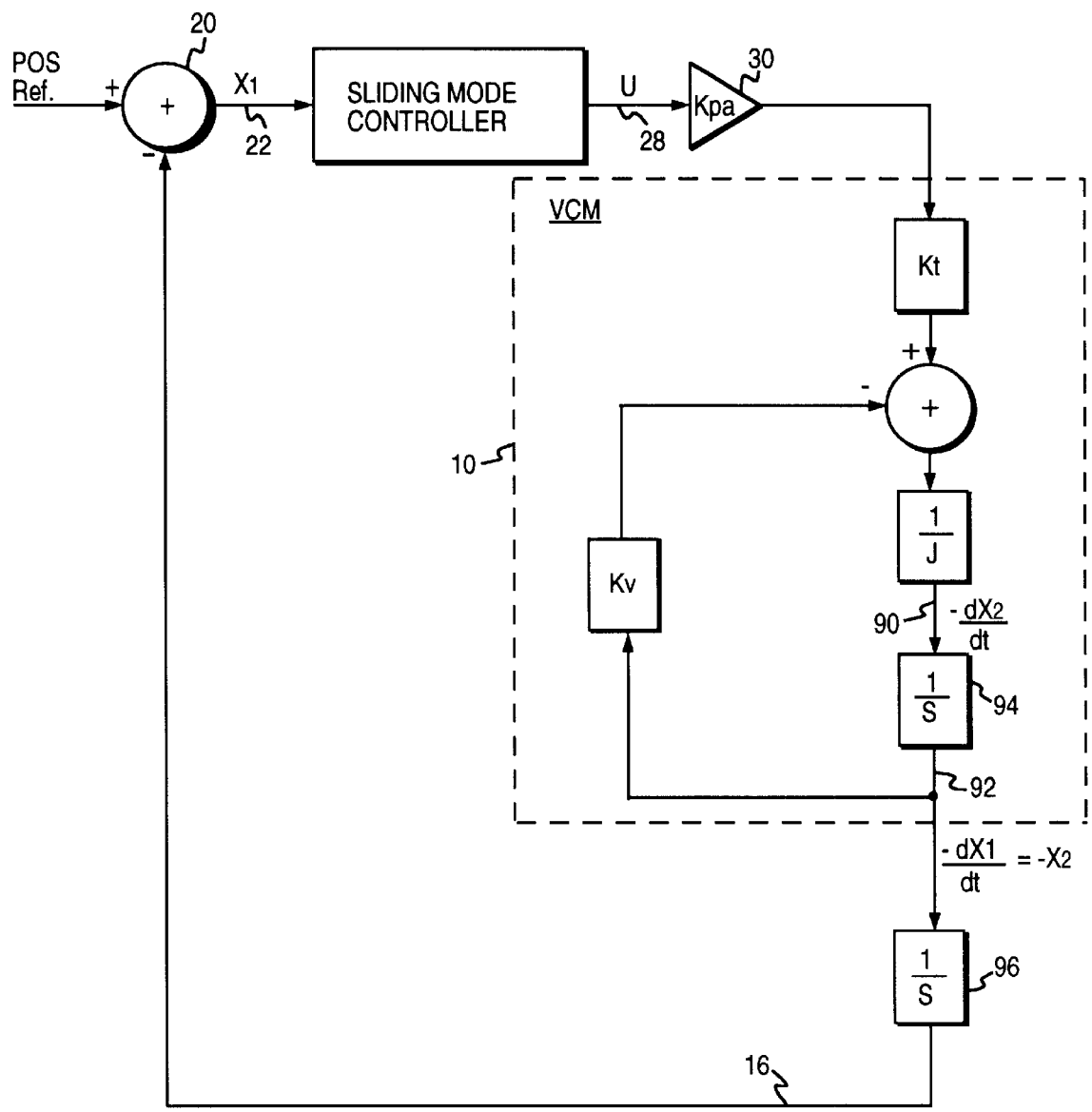
FIG. 5 illustrates the VCM controller as a second order system having a position error and position error velocity phase state.

FIG. 5 shows the disk actuator control system modeled as a second order plant. The output of the sliding mode controller U 28 is amplified 30 and input into the VCM 10. The parameters of the VCM 10 are:
  Kt=Torque Constant;
  Kv=Coefficient of Viscous Damping; and
  J=Inertia.

The input to the motor 90 is an acceleration command and the output 92 is a velocity. Therefore, the motor itself is modeled as an integrator 94. The servo fields 38, read channel circuitry 12, and state estimator 14 are also modeled as an integrator 96 since integrating the output velocity 92 of the VCM 10 generates the actuator position 16.

The position error phase state $X_1$ 22 is observed at the output of adder 20, and the position error velocity phase state $X_2$ is observed as the negative of the VCM 10 velocity 92. Alternatively, the position error velocity phase state $X_2$ can be generated by differentiating the position error signal $X_1$ 22 or generated by the state estimator 14. From FIG. 5, the phase state equations can be written as:

$$\frac{dX1}{dt} = X2; \tag{17}$$

and $$\frac{dX2}{dt} = -\frac{Kv}{J} \cdot X2 - \frac{Kt \cdot Kpa}{J} \cdot U$$

With $U = \pm K \cdot X_1$, the phase state equations are similar to equations (1) and (5), and the phase plots are similar to those shown in FIG. 3B.

Although the position error $X_1$ alone is sufficient to implement sliding mode, further control is attained when the position error velocity $X_2$ is added to the feedback loop. In fact, the disk drive actuator control system of the present invention operates optimum with the position error velocity $X_2$ as the only control signal during a seek since the position error $X_1$ is initially much larger than the position error velocity $X_2$. Removing the position error $X_1$ from the feedback loop during seeks reduces the amount of switching noise. When the phase states reach a predetermined point on the phase trajectory, the system switches the position error $X_1$ phase state back into the control loop.

Figure 6:
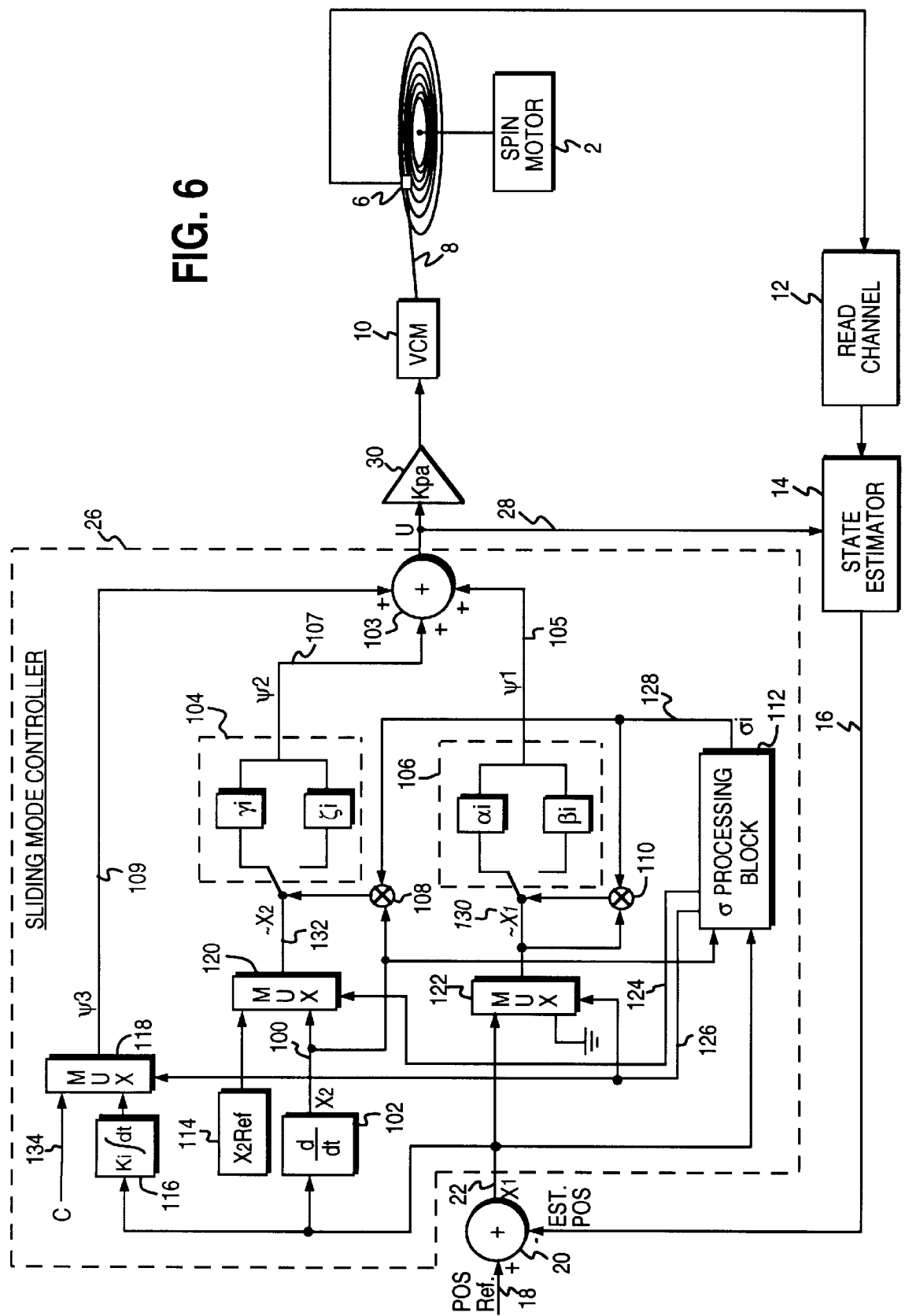
FIG. 6 is a detailed diagram of the disk drive control system of the present invention wherein the sliding mode controller is responsive to a position error and a position error velocity phase state.

FIG. 6 is a detailed diagram of the disk drive actuator sliding mode control system of the present invention. The actuator position error $X_1$ 22 is input into the sliding mode controller 26, and a differentiator 102 differentiates the actuator position error $X_1$ 22 to generate the actuator position error velocity signal $X_2$ 100. In an alternative embodiment not shown, the state estimator 14 generates the position error velocity $X_2$. Two switching gain circuits 106 and 104 multiply the position error $\sim X_1$ 130 and error velocity $\sim X_2$ 132 control signals, respectively. Multipliers 108 and 110, responsive to the phase states $\sim X_1$ and $X_2$ and the current trajectory segment $\sigma_i$, control the switching operation of the gain circuits. The sign of the resulting multiplication determines the state of the switch so as to drive the phase states $X_1$ and $X_2$ toward the predetermined sliding line trajectory shown in FIG. 4. A $\sigma$ processing block 112, responsive to the phase states $X_1$ and $X_2$, implements the trajectory segment switching logic to determine which segment $\sigma_i$ of the phase trajectory the phase states are to follow. The operation of the $\sigma$ processing block 112, the integrator 116, the reference error velocity generator 114, and multiplexers 118, 120, and 122, are discussed in detail bellow.

The gain values ($\alpha_i, \beta_i, \gamma_i$ and $\zeta_i$ in switching gain blocks 104 and 106 are programmably set to appropriate values according to the current trajectory segment being followed by the phase states. Also, the gain values are programmed to predetermined values depending on whether the controller is executing a forward or reverse seek. Using the existence equation (11) and the phase trajectory equations (13), (14), (15) and (16), the gain values for each segment of the phase trajectory shown in FIG. 4 can now be computed.

For $\sigma=\sigma_1$ (seek accelerate), differentiating equation (13) with respect to time and multiplying by equation (13) obtains:

$$\sigma 1 \cdot \frac{d\sigma 1}{dt} = \sigma 1 \cdot \left[ 2 \cdot C1 \cdot X2 \cdot \frac{dX2}{dt} \right] + \sigma 1 \cdot X2.$$

From equation (17) and factoring $\sigma_1 \cdot X2$ obtains:

$$\sigma 1 \cdot \frac{d\sigma 1}{dt} = \sigma 1 \cdot \left[ 2 \cdot C1 \cdot X2 \cdot \left[ -\frac{Kv}{J} \cdot X2 - \frac{Kt \cdot Kpa}{J} \cdot U + \frac{1}{2 \cdot C1} \right] \right]. \quad (18)$$

From FIGS. 5 and 6, and ignoring the $\psi_3$ term as insignificantly small during seeking:

$$U = \psi_1 X_1 + \psi_2 X_2 \quad (19)$$

where:

$$\psi 1 = \begin{cases} \alpha i & \text{if } \sigma i \cdot X1 > 0 \\ \beta i & \text{if } \sigma i \cdot X1 < 0 \end{cases} \quad (20)$$

$$\psi 2 = \begin{cases} \gamma i & \text{if } \sigma i \cdot X2 > 0 \\ \zeta i & \text{if } \sigma i \cdot X2 < 0 \end{cases} \quad (21)$$

From equations (18) and (19), and ignoring $$\frac{1}{2 \cdot C1}$$

as insignificantly small:

$$\sigma 1 \cdot \frac{d\sigma 1}{dt} = 2 \cdot C1 \cdot X2 \cdot \sigma 1 \cdot \quad (22)$$

$$\left[ -\frac{Kv}{J} \cdot X2 - \frac{Kt \cdot Kpa}{J} \cdot (\psi 1 \cdot X1 + \psi 2 \cdot X2) \right]$$

$$\sigma 1 \cdot \frac{d\sigma 1}{dt} = 2 \cdot C1 \cdot X2 \cdot$$

$$\left[ \left[ -\frac{Kv}{J} - \frac{Kt \cdot Kpa}{J} \cdot \psi 2 \right] \sigma 1 \cdot X2 - \left[ \frac{Kt Kpa}{J} \cdot \psi 1 \right] \sigma 1 \cdot X1 \right].$$

In order to satisfy existence equation (11) (i.e., equation (22) is negative for any $X_1$ and $X_2$), the gain constants must satisfy the following inequalities:

if reverse seeking ($X2 > 0$) then

{ if ($\sigma 1 \cdot X1 > 0$) from equation (20)

$\psi 1 = \alpha 1$ and for $\frac{Kt \cdot Kpa \cdot \alpha 1}{J} > 0 \quad => \alpha 1 > 0$ else if ($\sigma 1 \cdot X1 < 0$) from equation (20)

$\psi 1 = \beta 1$ and for $\frac{Kt \cdot Kpa \cdot \beta 1}{J} < 0 \quad => \beta 1 < 0$ if ($\sigma 1 \cdot X2 > 0$) from equation (21)

$\psi 2 =$ $\gamma 1$ and for $\left[ -\frac{Kv}{J} - \frac{Kt \cdot Kpa \cdot \gamma 1}{J} \right] < 0 \quad => \gamma 1 > -\frac{Kv}{Kt \cdot Kpa}$ else if ($\sigma 1 \cdot X2 < 0$) from equation (21)

$\psi 2 =$ $\zeta 1$ and for $\left[ -\frac{Kv}{J} - \frac{Kt \cdot Kpa \cdot \zeta 1}{J} \right] > 0 \quad => \zeta 1 < -\frac{Kv}{Kt \cdot Kpa}$

} else if forward seeking ($X2 < 0$) then

{ if ($\sigma 1 \cdot X1 > 0$) from equation (20)

$\psi 1 = \alpha 1$ and for $\frac{Kt \cdot Kpa \cdot \alpha 1}{J} < 0 \quad => \alpha 1 < 0$ else if ($\sigma 1 \cdot X2 < 0$) from equation (20)

$\psi 1 = \beta 1$ and for $\frac{Kt \cdot Kpa \cdot \beta 1}{J} > 0 \quad => \beta 1 > 0$ if ($\sigma 1 \cdot X2 > 0$) from equation (21)

$\psi 2 =$ $\gamma 1$ and for $\left[ -\frac{Kv}{J} - \frac{Kt \cdot Kpa \cdot \gamma 1}{J} \right] > 0 \quad => \gamma 1 < -\frac{Kv}{Kt \cdot Kpa}$ else if ($\sigma 1 \cdot X2 < 0$) from equation (21)

$\psi 2 =$ $\zeta 1$ and for $\left[ -\frac{Kv}{J} - \frac{Kt \cdot Kpa \cdot \zeta 1}{J} \right] < 0 \quad => \zeta 1 > -\frac{Kv}{Kt \cdot Kpa}$

}

For $\sigma=\sigma_2$ (seek at constant velocity) differentiating equation (14) with respect to time and multiplying by equation (14) obtains:

$$\sigma 2 \cdot \frac{d\sigma 2}{dt} = \sigma 2 \cdot \frac{dX2}{dt}$$

From equation (17):

$$\sigma 2 \cdot \frac{d\sigma 2}{dt} = \sigma 2 \cdot \left[ -\frac{Kv}{J} \cdot X2 - \frac{Kt \cdot Kpa}{J} \cdot U \right].$$

From equation (19):

$$\sigma 2 \cdot \frac{d\sigma 2}{dt} = \sigma 2 \cdot \left[ -\frac{Kv}{J} \cdot X2 - \frac{Kt \cdot Kpa}{J} \cdot (\psi 1 \cdot X1 + \psi 2 \cdot X2) \right] \quad (23)$$

$$\sigma 2 \cdot \frac{d\sigma 2}{dt} =$$

$$\left[ -\frac{Kv}{J} - \frac{Kt \cdot Kpa}{J} \cdot \psi 2 \right] \sigma 2 \cdot X2 - \left[ \frac{Kt \cdot Kpa}{J} \cdot \psi 1 \right] \sigma 2 \cdot X1.$$

In order to satisfy existence equation (11) (i.e., equation (23) is negative for any $X_1$ and $X_2$), the gain constants must satisfy the following inequalities:

if ($\sigma 2 \cdot X1 > 0$) from equation (20)

$\psi 1 = \alpha 2$ and for $\dfrac{Kt \cdot Kpa \cdot \alpha 2}{J} > 0 \quad => \alpha 2 > 0$ else if ($\sigma 2 \cdot X1 < 0$) from equation (20)

$\psi 1 = \beta 2$ and for $\dfrac{Kt \cdot Kpa \cdot \beta 2}{J} < 0 \quad => \beta 2 < 0$ if ($\sigma 2 \cdot X2 > 0$) from equation (21)

$\psi 2 =$ $\gamma 2$ and for $\left[ -\dfrac{Kv}{J} - \dfrac{Kt \cdot Kpa \cdot \gamma 2}{J} \right] < 0 \quad => \gamma 2 > -\dfrac{Kv}{Kt \cdot Kpa}$ else if ($\sigma 2 \cdot X2 < 0$) from equation (21)

$\psi 2 =$ $\zeta 2$ and for $\left[ -\dfrac{Kv}{J} - \dfrac{Kt \cdot Kpa \cdot \zeta 2}{J} \right] > 0 \quad => \zeta 2 > -\dfrac{Kv}{Kt \cdot Kpa}$ For $\sigma = \sigma_3$ (seek decelerate), differentiating equation (15) with respect to time and multiplying by equation (15) obtains:

$$\sigma 3 \cdot \dfrac{d\sigma 3}{dt} = \sigma 3 \cdot \left[ -2 \cdot C2 \cdot X2 \cdot \dfrac{dX2}{dt} \right] + \sigma 3 \cdot X2.$$

From equation (17) and factoring $\sigma_1 \cdot X2$ obtains:

$$\sigma 3 \cdot \dfrac{d\sigma 3}{dt} = \tag{24}$$

$$\sigma 3 \cdot \left[ -2 \cdot C2 \cdot X2 \cdot \left[ -\dfrac{Kv}{J} \cdot X2 - \dfrac{Kt \cdot Kpa}{J} \cdot U + \dfrac{1}{2 \cdot C2} \right] \right].$$

From equations (18) and (19), and ignoring term $1/2 \cdot C2$ as insignificantly small:

$$\sigma 3 \cdot \dfrac{d\sigma 3}{dt} = \tag{25}$$

$$-2 \cdot C2 \cdot X2 \cdot \sigma 3 \cdot \left[ -\dfrac{Kv}{J} \cdot X2 - \dfrac{Kt \cdot Kpa}{J} \cdot (\psi 1 \cdot X1 + \psi 2 \cdot X2) \right]$$

$$\sigma 3 \cdot \dfrac{d\sigma 3}{dt} = -2 \cdot C2 \cdot X2 \cdot$$

$$\left[ \left[ -\dfrac{Kv}{J} - \dfrac{Kt \cdot Kpa}{J} \cdot \psi 2 \right] \sigma 3 \cdot X2 - \left[ \dfrac{Kt \cdot Kpa}{J} \cdot \psi 1 \right] \sigma 3 \cdot X1 \right].$$

In order to satisfy existence equation (11) (i.e., equation (25) is negative for any $X_1$ and $X_2$), the gain constants must satisfy the following inequalities:

if reverse seeking ($X2 > 0$) then

{ if ($\sigma 3 \cdot X1 > 0$) from equation (20)

$\psi 1 = \alpha 3$ and for $\dfrac{Kt \cdot Kpa \cdot \alpha 3}{J} < 0 \quad => \alpha 3 < 0$ else if ($\sigma 3 \cdot X1 < 0$) from equation (20)

$\psi 1 = \beta 3$ and for $\dfrac{Kt \cdot Kpa \cdot \beta 3}{J} > 0 \quad => \beta 3 > 0$ if ($\sigma 3 \cdot X2 > 0$) from equation (21)

$\psi 2 =$ $\gamma 3$ and for $\left[ -\dfrac{Kv}{J} - \dfrac{Kt \cdot Kpa \cdot \gamma 3}{J} \right] > 0 \quad => \gamma 3 < -\dfrac{Kv}{Kt \cdot Kpa}$ else if ($\sigma 3 \cdot X2 < 0$) from equation (21)

$\psi 2 =$ $\zeta 3$ and for $\left[ -\dfrac{Kv}{J} - \dfrac{Kt \cdot Kpa \cdot \zeta 3}{J} \right] < 0 \quad => \zeta 3 > -\dfrac{Kv}{Kt \cdot Kpa}$

} else if forward seeking ($X2 < 0$) then

{ if ($\sigma 3 \cdot X1 > 0$) from equation (20)

$\psi 1 = \alpha 3$ and for $\dfrac{Kt \cdot Kpa \cdot \alpha 3}{J} > 0 \quad => \alpha 3 > 0$ else if ($\sigma 3 \cdot X1 < 0$) from equation (20)

$\psi 1 = \beta 3$ and for $\dfrac{Kt \cdot Kpa \cdot \beta 3}{J} < 0 \quad => \beta 3 < 0$ if ($\sigma 3 \cdot X2 > 0$) from equation (21)

$\psi 2 =$ $\gamma 3$ and for $\left[ -\dfrac{Kv}{J} - \dfrac{Kt \cdot Kpa \cdot \gamma 3}{J} \right] < 0 \quad => \gamma 3 > -\dfrac{Kv}{Kt \cdot Kpa}$ else if ($\sigma 3 \cdot X2 < 0$) from equation (21)

$\psi 2 =$ $\zeta 3$ and for $\left[ -\dfrac{Kv}{J} - \dfrac{Kt \cdot Kpa \cdot \zeta 3}{J} \right] > 0 \quad => \zeta 3 < -\dfrac{Kv}{Kt \cdot Kpa}$

}

For $\sigma = \sigma_4$ (tracking), differentiating equation (16) with respect to time and multiplying by equation (16) obtains:

$$\sigma 4 \cdot \dfrac{d\sigma 4}{dt} = \sigma 4 \cdot \dfrac{dX2}{dt} + \sigma 4 \cdot C3 \cdot \dfrac{dX1}{dt}$$

From equation (17):

$$\sigma 4 \cdot \dfrac{d\sigma 4}{dt} = \sigma 4 \cdot \left[ -\dfrac{Kv}{J} \cdot X2 - \dfrac{Kt \cdot Kpa}{J} \cdot U + C3 \cdot X2 \right].$$

From equation (19):

$$\sigma 4 \cdot \dfrac{d\sigma 4}{dt} = \tag{26}$$

$$\sigma 4 \cdot \left[ -\dfrac{Kv}{J} \cdot X2 - \dfrac{Kt \cdot Kpa}{J} \cdot (\psi 1 \cdot X1 + \psi 2 \cdot X2) + C3 \cdot X2 \right]$$

$$\sigma 4 \cdot \dfrac{d\sigma 4}{dt} =$$

$$\left[ C3 - \dfrac{Kv}{J} - \dfrac{Kt \cdot Kpa}{J} \cdot \psi 2 \right] \sigma 4 \cdot X2 - \left[ \dfrac{Kt \cdot Kpa}{J} \cdot \psi 1 \right] \sigma 4 \cdot X1.$$

In order to satisfy existence equation (11) (i.e., equation (26) is negative for any $X_1$ and $X_2$), the gain constants must satisfy the following inequalities:

if ($\sigma 4 \cdot X1 > 0$) from equation (20)

$\psi 1 = \alpha 4$ and for $\dfrac{Kt \cdot Kpa \cdot \alpha 4}{J} > 0 \quad => \alpha 4 > 0$ -continued else if ($\sigma 4 \cdot X1 < 0$) from equation (20)

$$\psi 1 = \beta 4 \text{ and for } \frac{Kt \cdot Kpa \cdot \beta 4}{J} < 0 \quad => \beta 4 < 0$$

if ($\sigma 4 \cdot X2 > 0$) from equation (21)

$\psi 2 =$ $$\gamma 4 \text{ and for } \left[ C - \frac{Kv}{J} - \frac{Kt \cdot Kpa \cdot \gamma 4}{J} \right] < 0 \quad => \gamma 4 > \frac{C - Kv}{Kt \cdot Kpa}$$

else if ($\sigma 4 \cdot X2 < 0$) from equation (21)

$\psi 2 =$ $$\zeta 4 \text{ and for } \left[ C - \frac{Kv}{J} - \frac{Kt \cdot Kpa \cdot \zeta 4}{J} \right] > 0 \quad => \zeta 4 < \frac{C - Kv}{Kt \cdot Kpa}$$

Operation of the sliding mode controller shown in FIG. 6 will now be further explained with reference to the flow charts of FIGS. 7A, 7B, and 7C. Assuming the servo control system is initially in the tracking mode 200 of FIG. 7A, the actuator 8 tracks 204 the currently selected track until a seek forward or seek reverse command is received. When a forward seek is initiated, SEEK? is YES and the actuator position reference, POS Ref 18, is updated to a newly selected track. The initial actuator position error $X_1$ 22 at the output of adder 20 is the difference between the current track 16 output from state estimator 14 and a newly selected track. This initial position error is also shown in FIG. 4 as the beginning of trajectory segment $\sigma=\sigma_1$ 80 at $X_{1l}$. Segment $\sigma=\sigma_1$ 80 is a parabolic trajectory that describes the desired acceleration of the actuator toward the selected track.

Figure 7A:
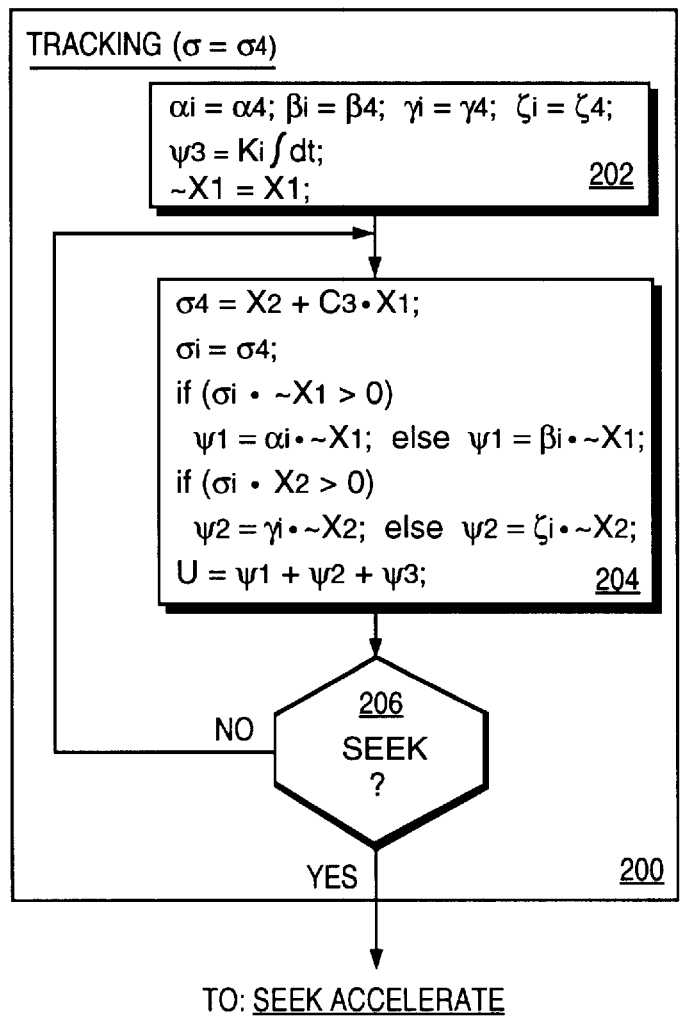
FIGS. 7A, 7B, and 7C are flow charts that describe the operation of the sliding mode controller with reference to FIG. 6.
Figure 7B:
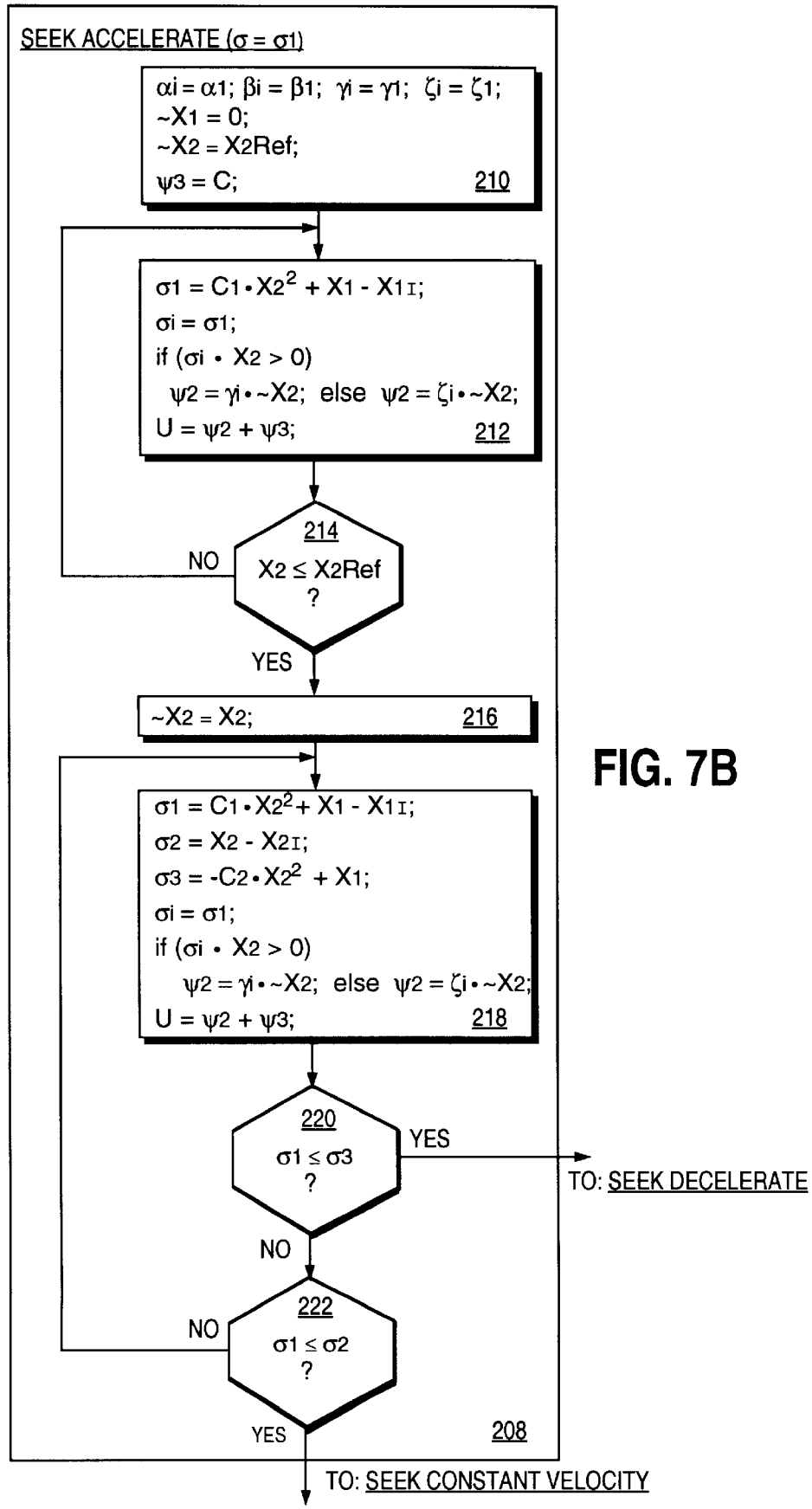

Referring now to FIG. 7B, at the beginning of SEEK ACCELERATE ($\sigma=\sigma_1$) 208, the sliding mode controller initializes various parameters 210. The gain constants in blocks 104 and 106 of FIG. 6 are updated to the values corresponding to the acceleration trajectory $\sigma=\sigma_1$ 80. In order to reduce switching noise during a seek operation, the position error phase state $X_1$ 22 is switched out of the sliding mode control. The $\sigma$ processing block 112 selects, over line 126, the ground plane as the output of multiplexer 122. As a result, $\sim X_1$ 130 is set to zero in order to disable the switching action of multiplier 110 and to remove the contribution of $\psi_1$ from the computation of the VCM command U 28 at the output of adder 103. Because the position error phase state $\sim X_1$ 130 is disabled, the velocity phase state $\sim X_2$ 132 is initialized to a predetermined value to ensure the actuator begins moving in the desired direction (i.e., moving in reverse toward the selected track). To accomplish this, the $\sigma$ processing block 112 selects, over line 124, $X_2$Ref 114 as the output of multiplexer 120. The $\sigma$ processing block 112 also selects, over line 126, the predetermined constant C 134 as the output of multiplexer 118 (the third input $\psi_3$ 109 to adder 103). The function of the predetermined constant C 134 and the integrator 116 are discussed in further detail bellow.

After the control parameters have been initialized for the acceleration trajectory $\sigma=\sigma_1$ 80, the sliding mode controller 26 continuously computes and outputs the VCM command signal U 28 at the output of adder 103. Referring to flow chart 212, $\sigma_1$ is updated according to equation (13) and $\sigma_i$ 128 is assigned to $\sigma_1$. Multiplier 108 (which can be implemented as a simple XOR of the operand sign bits) multiplies $\sigma_i$ by $X_2$ and switches gain block 104 to $\gamma_i$ if the result is positive and to $\zeta_i$ if the result is negative. Gain block 104 multiplies $\sim X_2$ 132 ($X_2$Ref 114) by the selected gain to generate $\psi_2$. Adder 103 adds $\psi_1$, $\psi_2$, and $\psi_3$ to generate the VCM command U 28. Since $\psi_1$ is zero during acceleration and $\psi_3$ is insignificantly small, the VCM command signal U 28 is predominately equal to $\psi_2$.

Amplifier Kpa 30 amplifies the command signal U 28 and applies it to the VCM 10. As the actuator 8 begins to accelerate in reverse toward the selected track, the read/write head 6 passes over the servo data of the next adjacent track and reads the corresponding track address. The read channel 12 decodes the track address and transmits it to the state estimator 14 which, in response to the track address and the current VCM command 28, updates the actuator position signal 16. Adder 20 outputs the new position error $X_1$ 22, and differentiator 102 computes the new velocity phase state $X_2$ 100 as $X_1(N)-X_1(N-1)$.

The $\sigma$ processing block 112 continuously checks to determine when the velocity of the actuator reaches a predetermined value. If $X_2 \leq X_2$Ref? 214 is NO, then the sliding mode controller loops around and computes the next VCM command U 28 according to flowchart 212. If $X_2 \leq X_2$Ref? 214 is YES, then the $\sigma$ processing block 112 selects, over line 124, $X_2$ 100 as the output of multiplexer 120 (setting $\sim X_2 = X_2$ 216). In other words, once the velocity of the actuator 8 ($X_2$ 100) reaches a predetermined speed ($X_2$Ref 114), the sliding mode controller 26 generates the VCM command signal U 28 in flow chart 218 as a function of the velocity phase state $X_2$ 100.

Continuing now to flow chart 218 shown in FIG. 7B, the $\sigma$ processing block 112 updates $\sigma_1$, $\sigma_2$, and $\sigma_3$ according to equations (13), (14), and (15), respectively. The output $\sigma_i$ 128 of $\sigma$ processing block 112 is assigned to $\sigma_1$. In response to $\sigma_i$ and $X_2$, multiplier 108 sets the state of switching gain block 104 in order to drive $X_1$ and $X_2$ toward the $\sigma_1$ 80 phase trajectory. The next command U 28 is generated and applied to the VCM 10 to continue moving the actuator 8 toward the selected track.

The $\sigma$ processing block 112 continuously checks the location of the phase states with respect to the acceleration trajectory $\sigma_1$ 80 to determine when to switch to the next trajectory segment. The next trajectory segment will either be the constant velocity segment $\sigma_2$ 82 or, if the seek distance is sufficiently short, the deceleration segment $\sigma_3$ 84. By comparing the $\sigma$ values, the $\sigma$ processing block 112 determines when to switch to the next trajectory. If $\sigma_1 \leq \sigma_3$? 220 is YES, then the $\sigma$ processing block 112 switches to the deceleration trajectory $\sigma_3$ 84. Else if $\sigma_1 \leq \sigma_2$? 222 is YES, then the $\sigma$ processing block 112 switches to the constant velocity trajectory $\sigma_2$ 82. If both 220 and 222 are NO, then the sliding mode controller 26 loops around and computes the next VCM command U 28 according to flow chart 218.

Figure 7C:
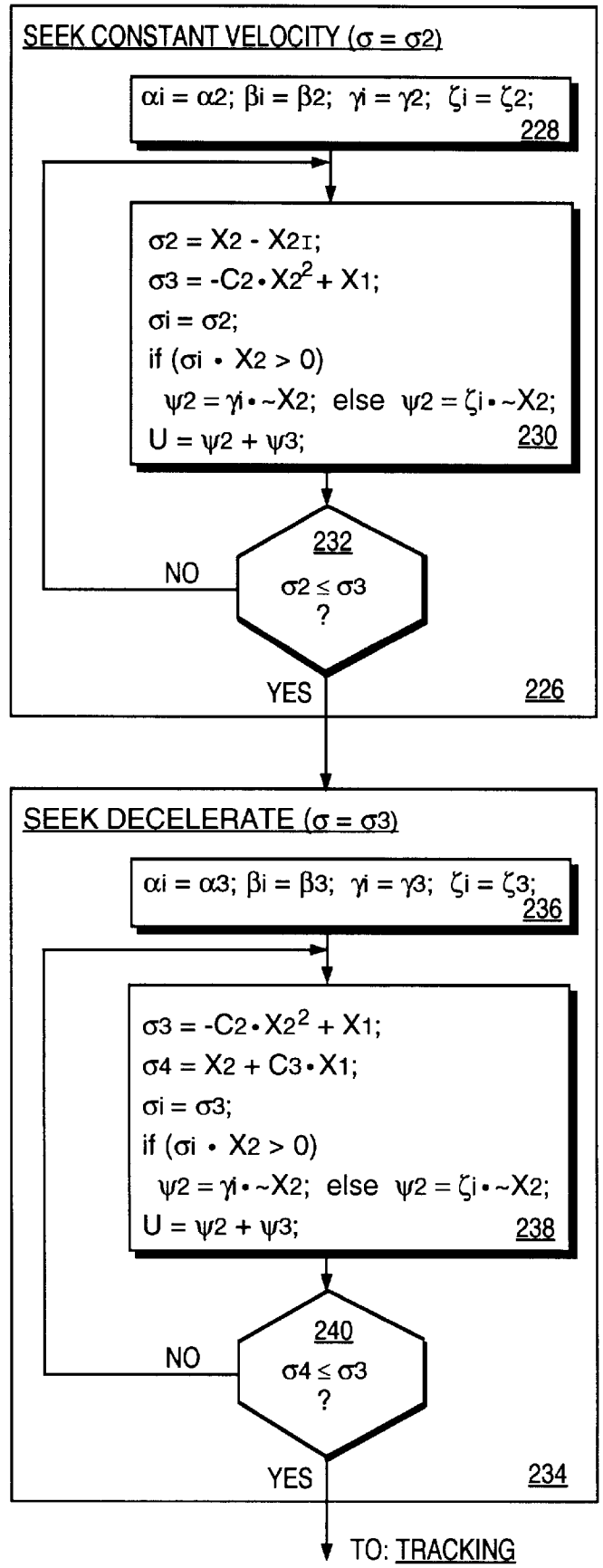

Referring now to the constant velocity flow chart shown in FIG. 7C, first the gain constants for switching gain blocks 104 and 106 are updated 228 to values corresponding to the constant velocity trajectory $\sigma_2$ 82 of FIG. 4. Then, in flow chart 230, the $\sigma$ processing block 112 updates $\sigma_2$ and $\sigma_3$ according to equations (14) and (15), respectively. The output $\sigma_i$ 128 of $\sigma$ processing block 112 is assigned to $\sigma_2$. Again, in response to $\sigma_i$ and $X_2$, multiplier 108 sets the state of switching gain block 104 in order to drive $X_1$ and $X_2$ toward the $\sigma_2$ 82 phase trajectory. The next command U 28 is generated and applied to the VCM 10 to continue moving the actuator 8 toward the selected track.

The $\sigma$ processing block 112 continuously checks the location of the phase states with respect to the constant velocity trajectory $\sigma_2$ 82 to determine when to switch to the deceleration trajectory segment $\sigma_3$ 84. If $\sigma_2 \leq \sigma_3$? 232 is YES, then the $\sigma$ processing block 112 switches to the deceleration trajectory $\sigma_3$ 84. Otherwise, the sliding mode controller 26 loops around and computes the next VCM command U 28 according to flow chart 230.

Continuing now to the deceleration flow chart 234, first the gain constants for switching gain blocks 104 and 106 are updated 236 to values corresponding to the deceleration trajectory $\sigma_3$ 84 of FIG. 4. Then, in flow chart 238, the $\sigma$ processing block 112 updates $\sigma_3$ and $\sigma_4$ according to equations (15) and (16), respectively. The output $\sigma_i$ 128 of $\sigma$ processing block 112 is assigned to $\sigma_3$. Again, in response to $\sigma_i$ and $X_2$, multiplier 108 sets the state of switching gain block 104 in order to drive $X_1$ and $X_2$ toward the $\sigma_3$ 84 phase trajectory. The next command U 28 is generated and applied to the VCM 10 to decelerate the actuator 8 toward the selected track.

The $\sigma$ processing block 112 continuously checks the location of the phase states with respect to the deceleration trajectory $\sigma_3$ 84 to determine when to switch to the tracking trajectory segment $\sigma_4$ 86. If $\sigma_4 \leq \sigma_3$? 240 is YES, then the $\sigma$ processing block 112 switches to the tracking trajectory $\sigma_4$ 86. Otherwise, the sliding mode controller 26 loops around and computes the next VCM command U 28 according to flow chart 238.

When the sliding mode controller 26 switches to tracking mode, the read channel process the servo burst information 42 recorded adjacent to the selected track's centerline in order to generate an actuator 8 offset position relative to the centerline. In response to the offset position and the command signal U 28, the state estimator 14 generates the estimated actuator position 16 which is subtracted from the reference selected track position 18 to generate the position error $X_1$ 22.

Referring again to flow chart 200 of FIG. 7A, the gain constants for switching gain blocks 104 and 106 are updated 202 to values corresponding to the tracking trajectory $\sigma_4$ 86 of FIG. 4. The $\sigma$ processing block 112 selects via line 126 the output of integrator 116 as the output of multiplexer 118 (i.e., $\psi_3$). The $\sigma$ processing block 112 also switches the position error phase state $X_1$ 22 back into the sliding mode computation, by selecting via line 126, as the output of multiplexer 122, the position error phase state $X_1$ 22 as the input to multiplier 110. Again, the position error phase state $X_1$ 22 is not used during seeks in order to reduce switching noise.

Referring now to flow chart 204, the $\sigma$ processing block 112 updates $\sigma_4$ according to equations (16). The output $\sigma_i$ 128 of $\sigma$ processing block 112 is assigned to $\sigma_4$. In response to $\sigma_i$, $X_1$, and $X_2$, multipliers 108 and 110 set the state of switching gain blocks 104 and 108, respectively, in order to drive $X_1$ and $X_2$ toward the $\sigma_4$ 86 phase trajectory. The next command U 28 is generated and applied to the VCM 10 to continue tracking the centerline of the selected track.

After reaching the selected track, several biasing forces can cause the actuator 8 to have a steady state DC offset from the centerline. Typical biasing forces include the radial component of the windage caused by the rotating disks, tilt of the disk stack, biases in the flexible cables, and electrical offsets. To compensate for these biasing forces and drive the steady state position error to zero, an integrator 116 integrates the position error phase state $X_1$ 22 and its output 109 is summed 103 into the output 28 of the sliding mode controller 26.

The biasing forces do not vary with time, however, they do vary with the radial position of the actuator 8. Therefore, the steady state integration value 109 corresponding to the biasing forces for each track is stored in memory. When seeking a selected new track, the integrator 116 is disabled and the steady state integration value stored in memory corresponding to the selected new track is added 103 as a constant 134 to the control signal 28. When the actuator 8 reaches the selected new track and the head has settled sufficiently, the integrator 116 is re-enabled and its output added 103 back into the control signal 28.

For reverse seeks, the sliding mode controller 26 operates as described in the flow charts of FIGS. 7A, 7B, and 7C except that the inequalities are reversed. The $\sigma$ processing block 112 can also adjust the slope of the linear phase trajectory segment as shown in FIG. 3D. An alternative embodiment of the $\sigma$ processing block 112 would be to compare the position error and velocity phase states to values stored in a look up table where the stored values represent the phase plane trajectory shown in FIG. 4.

Figure 8:
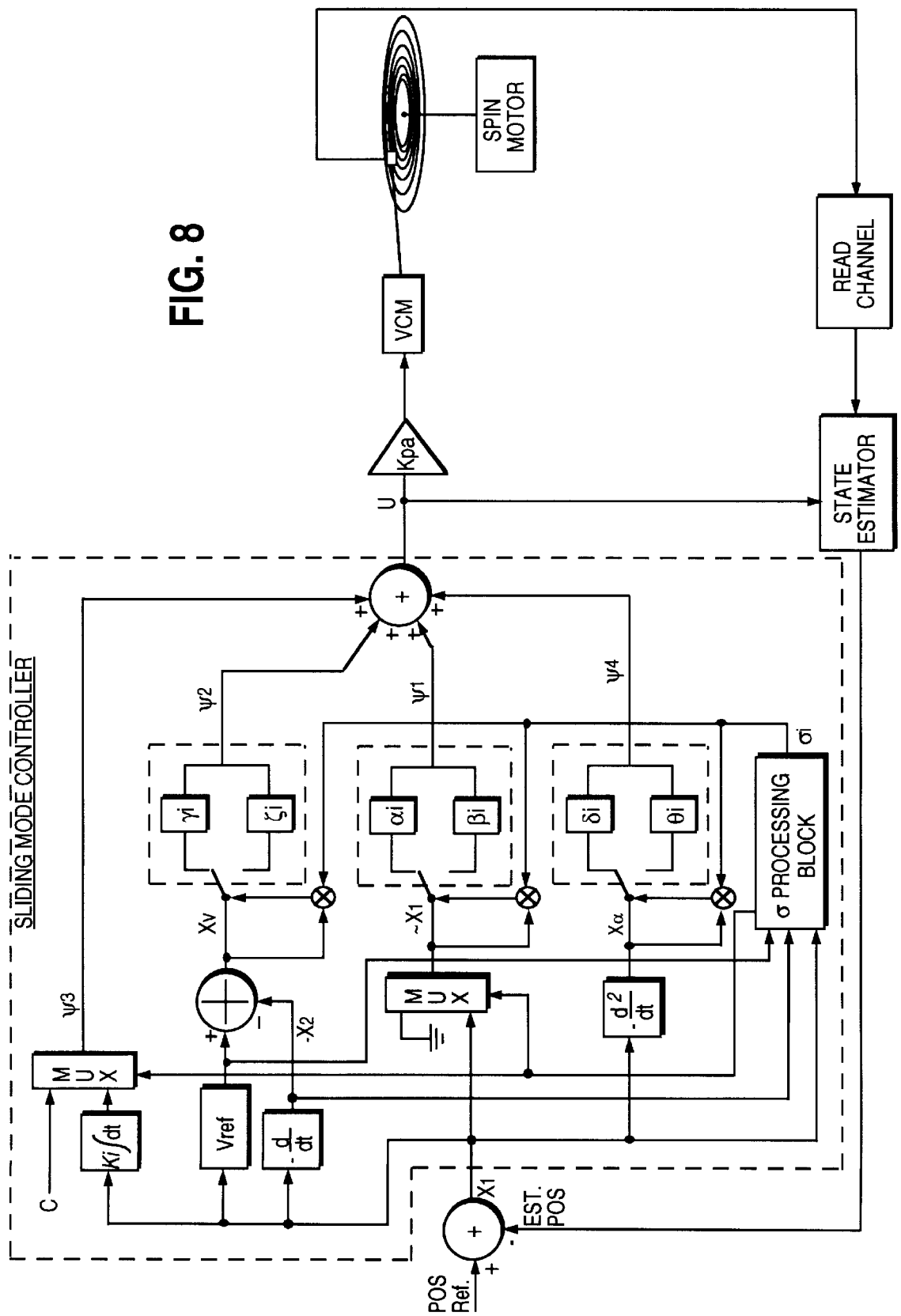
FIG. 8 is a detailed block diagram of an alternative embodiment of the present invention where the sliding mode controller is responsive to an actuator position error, velocity error, and acceleration phase states.

An alternative embodiment for the sliding mode controller of the present invention is shown in FIG. 8. The sliding mode operation is the same as that of FIG. 6 during the constant velocity seek mode ($\sigma = \sigma_2$) and the tracking mode ($\sigma = \sigma_4$). During seek accelerate ($\sigma = \sigma_1$) and seek decelerate ($\sigma = \sigma_3$), however, the state space is defined in the plane ($X_v$, $X_\alpha$), where $X_v$ is an actuator velocity error phase state and $X_\alpha$ is an actuator acceleration phase state.

During seek accelerate and seek decelerate, a reference velocity Vref is generated as a function of the position error $X_1$ corresponding to the velocity profiles $\sigma_1$ 80 and $\sigma_3$ 84 shown in FIG. 4. The reference velocity generator can be implemented with a lookup table or with polynomial equations. An actuator velocity error phase state $X_v$ is generated by subtracting an estimated actuator velocity $-X_2$ from the reference velocity Vref. An actuator acceleration phase state $X_\alpha$ is generated by taking the second derivative of the position error $X_1$. Phase states $X_v$ and $X_\alpha$ are multiplied by respective switching gain blocks to generate control signals $\psi_2$ and $\psi_4$. As discussed with reference to FIGS. 6 and 7, control signal $\psi_1$ is disabled during seeks and $\psi_3$ is insignificantly small. Therefore, the motor control signal U is a function of $\psi_2$ and $\psi_4$ during seek accelerate and seek decelerate. During seek at constant velocity ($\sigma = \sigma_2$) and tracking ($\sigma = \sigma_4$), Vref is set to zero such that $X_v = X_2$, and $\psi_4$ is disabled by setting the gains $\delta$ and $\theta$ in the switching gain block to zero. In this manner, the sliding mode controller of FIG. 8 operates as described in FIGS. 6 and 7 during seek at constant velocity and tracking.

The trajectory segments $\sigma_i$ used by the $\sigma$ processing block of FIG. 8 are defined as:

$\sigma_1 = [X_v - C_1 \cdot X_\alpha]$;

$\sigma_2 = X_2 - X_{2I}$;

$\sigma_3 = -[X_v - C_2 \cdot X_\alpha]$;

$\sigma_4 = X_2 + C_3 \cdot X_1$; where $C_1$ = a predetermined acceleration constant;

$X_{1I}$ = an initial actuator position error;

$X_{2I}$ = a predetermined constant position error velocity;

$C_2$ = a predetermined deceleration constant; and $C_3$ = a predetermined slope of the linear deceleration segment.

The $\sigma$ processing block switches between trajectory segments according to the following inequalities:

$\sigma_1$ to $\sigma_2$ when $|X_2| > X_{2I}$;

$\sigma_2$ to $\sigma_3$ when $|Vref(k)| < |Vref(k-1)|$;

$\sigma_3$ to $\sigma_4$ when $|X_1| <$ predetermined track acquire threshold; and $\sigma_1$ to $\sigma_3$ when $(X_1 * X_v < 0)$ and $(|X_2| \leq |V_{2I}|)$.

Many changes in form and detail could be made without departing from the spirit and scope of the present invention; the particular embodiments disclosed are not intended to be limiting. For instance, the sliding mode controller may be implemented in hardware or software, and higher order phase states could be used in place of, or in addition to, the particluar phase states disclosed. In yet another embodiment, rather than embed the servo data on every disk within the sectors of user data as shown in FIG. 2A, the servo data can be recorded on a dedicated servo disk in a disk array. These and other modifications derived from the disclosed embodiment are within the intended scope of the present invention as properly construed from the following claims.

We claim:

1. A magnetic disk drive storage system for recording digital data, comprising:
   (a) at least one rotating magnetic disk comprising a plurality of concentric data tracks recorded thereon, wherein the data tracks comprise user data and servo data;
   (b) a magnetic read/write head positioned over the magnetic disk, for recording the digital data onto the magnetic disk and reading the digital data from the magnetic disk;
   (c) an actuator connected to the read/write head, for positioning the read/write head over a selected track;
   (d) a motor connected to the actuator and having an input for receiving a motor control signal, the motor for controlling the motion of the actuator;
   (e) a phase state generator, responsive to the servo data, for generating at least one phase state signal; and
   (f) a sliding mode controller, responsive to the at least one phase state signal, for generating and outputting the motor control signal, wherein the sliding mode controller operates in a seek mode to move the read/write head from a current track to a selected track and in a tracking mode to keep the read/write head substantially aligned over a centerline of the selected track while reading the user data;

wherein:
   (a) the magnetic disk drive storage system has at least two phase states;
   (b) the sliding mode controller switches between a first and a second structure;
   (c) the first structure causes the two phase states to change relative to a phase plane to follow a first phase trajectory;
   (d) the second structure causes the two phase states to change relative to the phase plane to follow a second phase trajectory;
   (e) the first and second phase trajectories intersect in opposite directions in at least part of the phase plane;
   (f) by switching between the first and second structures the sliding mode controller causes the two phase states to change relative to the phase plane to substantially follow a predetermined third phase trajectory; and
   (g) the third phase trajectory is within the part of the phase plane where the first and second phase trajectories intersect.

2. The magnetic disk drive storage system as recited in claim 1, wherein the phase state generator comprises a state estimator.

3. The magnetic disk drive storage system as recited in claim 2, wherein the state estimator is responsive to the servo data and the motor control signal for outputting an estimated actuator position, further including an adder for subtracting the estimated actuator position from a reference actuator position to generate an actuator position error phase state signal.

4. The magnetic disk drive storage system as recited in claim 1, wherein:
   (a) the servo data comprises track number information and servo bursts;
   (b) the phase state generator generates the at least one phase state signal in response to the track number information when seeking a selected track; and
   (c) the phase state generator generates the at least one phase state signal in response to the servo bursts when tracking the centerline of the selected track.

5. The magnetic disk drive storage system as recited in claim 1, wherein the at least one phase state signal comprises an actuator position error signal proportional to a difference between a desired actuator position and an estimated actuator position.

6. The magnetic disk drive storage system as recited in claim 1, wherein the at least one phase state signal comprises an actuator position error velocity signal proportional to a derivative of an actuator position error.

7. The magnetic disk drive storage system as recited in claim 1, wherein the at least one phase state signal comprises an actuator velocity error signal proportional to a difference between a reference actuator velocity and an estimated actuator velocity.

8. The magnetic disk drive storage system as recited in claim 1, wherein the at least one phase state signal comprises an actuator acceleration signal proportional to a derivative of an actuator velocity.

9. The magnetic disk drive storage system as recited in claim 1, wherein the at least one phase state signal comprises:
   (a) an actuator position error signal proportional to a difference between a desired actuator position and an estimated actuator position; and
   (b) an actuator position error velocity signal proportional to a derivative of the actuator position error.

10. The magnetic disk drive storage system as recited in claim 1, wherein the at least one phase state signal comprises:
    (a) an actuator position error signal proportional to a difference between a desired actuator position and an estimated actuator position; and
    (b) an actuator velocity error signal proportional to a difference between a reference actuator velocity and an estimated actuator velocity; and
    (c) an actuator acceleration signal proportional to a derivative of the estimated actuator velocity.

11. The magnetic disk drive storage system as recited in claim 1, wherein the two phase states comprise an actuator position error phase state and an actuator position error velocity phase state.

12. The magnetic disk drive storage system as recited in claim 1, wherein:
    (a) the first structure comprises a first multiplier for multiplying a positive gain term by the at least one phase state signal; and
    (b) the second structure comprises a second multiplier for multiplying a negative gain term by the at least one phase state signal.

13. The magnetic disk drive storage system as recited in claim 1, wherein the third phase trajectory comprises a substantially linear segment.

14. The magnetic disk drive storage system as recited in claim 13, wherein:
    (a) the two phase states comprise an actuator position error phase state and an actuator position error velocity phase state; and (b) the substantially linear segment is proportional to:
$X_2 + C_1 * X_1$ where
$C_1$ = a predetermined slope of the substantially linear segment
$X_1$ = the actuator position error phase state; and
$X_2$ = the actuator position error velocity phase state.

15. The magnetic disk drive storage system as recited in claim 14, further comprising a phase trajectory adjustor for adjusting the slope of the linear segment of the third phase trajectory.

16. The magnetic disk drive storage system as recited in claim 13, wherein:
    (a) the third phase trajectory comprises a first substantially linear segment having an originating end and a terminating end connected to an originating end of a second substantially linear segment;
    (b) the second substantially linear segment having a terminating end connected to a third substantially linear segment; and
    (c) a part of the third substantially linear segment is near the origin of the phase plane.

17. The magnetic disk drive storage system as recited in claim 16, wherein:
    (a) the first segment represents an acceleration of the read/write head;
    (b) the second segment represents a constant velocity of the read/write head; and
    (c) the third segment represents a deceleration of the read/write head.

18. The magnetic disk drive storage system as recited in claim 16, wherein:
    (a) the two phase states comprise an actuator position error phase state and an actuator position error velocity phase state;
    (b) the first segment is proportional to:
    $X_2 - C_1 * (X_1 - X_{1I})$ where
    $C_1$ = a predetermined slope of the first segment;
    $X_1$ = the actuator position error phase state;
    $X_{1I}$ = an initial actuator position error; and
    $X_2$ = the actuator position error velocity phase state;
    (c) the second segment is proportional to:
    $X_2 - X_{2I}$ where
    $X_{2I}$ = a predetermined constant actuator position error velocity; and
    (d) the third segment is proportional to:
    $X_2 + C_2 * X_1$ where
    $C_2$ = a predetermined slope of the third segment.

19. The magnetic disk drive storage system as recited in claim 16, wherein:
    (a) the sliding mode controller operates in a seek mode to move the read/write head from a current track to a selected track and in a tracking mode to keep the read/write head substantially aligned over a centerline of the selected track while reading the user data and servo data;
    (b) when the sliding mode controller switches to seek mode in order to move the read/write head to the selected track, the sliding mode controller switches between the first and second structure repeatedly according to a first switching algorithm so that the two phase states follow the first segment, thereby accelerating the read/write head toward the selected track;
    (c) when the two phase states substantially reach the originating end of the second segment, the sliding mode controller switches between the first and second structures repeatedly according to a second switching algorithm so that the two phase states follow the second segment, thereby moving the read/write head toward the selected track at a substantially constant velocity;
    (d) when the two phase states substantially reach the originating end of the third segment, the sliding mode controller switches between the first and second structures repeatedly according to a third switching algorithm so that the two phase states follow the third segment, thereby decelerating the read/write head toward the desired track; and
    (e) when the two phase states are within a predetermined minimum distance from the part of the third segment near the origin of the phase plane, the sliding mode controller switches to the tracking mode and the sliding mode controller continues switching between the two structures repeatedly in order to keep the two states near the origin of the phase plane, thereby keeping the read/write head near the centerline of the selected track.

20. The magnetic disk drive storage system as recited in claim 1, wherein:
    (a) the sliding mode controller operates in a seek mode to move the read/write head from a current track to a selected track and in a tracking mode to keep the read/write head substantially aligned over a centerline of the selected track while reading the user data and servo data;
    (b) the first phase trajectory intersects the third phase trajectory at an intersection point;
    (c) a part of the third trajectory is near the origin of the phase plane;
    (d) when the sliding mode controller switches to seek mode in order to move the read/write head to the selected track, the sliding mode controller switches to the first structure and remains in the first structure while the two phase states follow the first phase trajectory until the two states substantially reach the intersection point;
    (e) when the two states substantially reach the intersection point, the sliding mode controller switches between the first and second structures repeatedly so that the two phase states follow the predetermined third phase trajectory; and
    (f) when the two states are within a predetermined minimum distance from the part of the third phase trajectory near the origin of the phase plane, the sliding mode controller switches to the tracking mode and the sliding mode controller continues switching between the two structures repeatedly in order to keep the two phase states near the origin of the phase plane, thereby keeping the read/write head near the centerline of the selected track.

21. The magnetic disk drive storage system as recited in claim 1, wherein:
    (a) the third phase trajectory comprises a first substantially parabolic segment having an originating end and a terminating end connected to an originating end of a first substantially linear segment;
    (b) the first substantially linear segment having a terminating end connected to an originating end of a second substantially parabolic segment;
    (c) the second substantially parabolic segment having a terminating end connected to an originating end of a second substantialy linear segment; and
    (d) a part of the second substantially linear segment is near the origen of the phase plane.

22. The magnetic disk drive storage system as recited in claims 21, wherein:
  (a) the first substantially parabolic segment represents an acceleration of the read/write head;
  (b) the first substantially linear segment represents a constant velocity of the read/write head; and
  (c) the second substantially parabolic segment and the second substantially linear segment represent a deceleration of the read/write head.

23. The magnetic disk drive storage system as recited in claim 21, wherein:
  (a) the two phase states comprise an actuator position error phase state and an actuator position error velocity phase state;
  (b) the first substantially parabolic segment is proportional to:
    $C_1*X_2^2+X_1-X_{1I}$ where
      $C_1$=a predetermined acceleration constant;
      $X_1$=the actuator position error phase state;
      $X_{1I}$=an initial actuator position error; and
      $X_2$=the actuator position error velocity phase state;
  (c) the first substantially linear segment is proportional to:
    $X_2-X_{2I}$ where
      $X_{2I}$=a predetermined constant actuator position error velocity;
  (d) the second substantially parabolic segment is proportional to:
    $-C_2*X_2^2+X_1$ where
      $C_2$=a predetermined deceleration constant; and
  (e) the second substantially linear segment is proportional to:
    $X_2+C_3*X_1$ where
      $C_3$=a predetermined slope of the second substantially linear segment.

24. The magnetic disk drive storage system as recited in claim 21, wherein:
  (a) the sliding mode controller operates in a seek mode to move the read/write head from a current track to a selected track and in a tracking mode to keep the read/write head substantially aligned over a centerline of the selected track while reading the user data and servo data;
  (b) when the sliding mode controller switches to seek mode in order to move the read/write head to the selected track, the sliding mode controller switches between the first and second structure repeatedly according to a first switching algorithm so that the two phase states follow the first substantially parabolic segment, thereby accelerating the read/write head toward the selected track;
  (c) when the two phase states substantially reach the originating end of the first substantially linear segment, the sliding mode controller switches between the first and second structures repeatedly according to a second switching algorithm so that the two phase states follow the first substantially linear segment, thereby moving the read/write head toward the selected track at a substantially constant velocity;
  (d) when the two phase states substantially reach the originating end of the second substantially parabolic segment, the sliding mode controller switches between the first and second structures repeatedly according to a third switching algorithm so that the two phase states follow the second substantially parabolic segment, thereby decelerating the read/write head toward the selected track;
  (e) when the two phase states substantially reach the originating end of the second substantially linear segment, the sliding mode controller switches between the first and second structures repeatedly according to a fourth switching algorithm so that the two phase states follow the second substantially linear segment, thereby decelerating the read/write head toward the selected track; and
  (f) when the two phase states are within a predetermined minimum distance from the part of the second substantially linear segment near the origin of the phase plane, the sliding mode controller switches to the tracking mode and the sliding mode controller continues switching between the two structures repeatedly in order to keep the two phase states near the origin of the phase plane, thereby keeping the read/write head near the centerline of the selected track.

25. The magnetic disk drive storage system as recited in claim 24, further comprising:
  (a) switching logic, responsive to the at least one phase state signal, for controlling the switching between the first and second structures, wherein the switching logic operates in a predetermined mode corresponding to a current segment of a current trajectory being followed by the two phase states; and
  (b) a σ processing block, responsive to the at least one phase state signal, for controlling the operating mode of the switching logic.

26. The magnetic disk drive storage system as recited in claim 25, wherein the σ processing block is implemented using a look up table.

27. The magnetic disk drive storage system as recited in claim 25, wherein the σ processing block is implemented using trajectory polynomial equations.

28. The magnetic disk drive storage system as recited in claim 25, wherein:
  (a) the σ processing block switches the switching logic from an operating mode for the first segment to an operating mode for the second segment when:
    $\sigma_1 \leq \sigma_2$; where
      $\sigma_1$=a phase state value relative to the first segment; and
      $\sigma_2$=a phase state value relative to the second segment;
  (b) the trajectory segment logic switches the switching logic from an operating mode for the second segment to an operating mode for the third segment when:
    $\sigma_2 \leq \sigma_3$; where
      $\sigma_2$=a phase state value relative to the second segment; and
      $\sigma_3$=a phase state value relative to the third segment.

29. The magnetic disk drive storage system as recited in claim 25, wherein the σ processing block switches the switching logic from an operating mode for the third segment to an operating mode for the fourth segment when:
  $\sigma_3 \leq \sigma_4$; where
    $\sigma_3$=a phase state value relative to the third segment; and
    $\sigma_4$=a phase state value relative to the fourth segment.

30. The magnetic disk drive storage system as recited in claim 25, wherein:
  (a) the two phase states comprise an actuator position error phase state $X_1$ and an actuator position error velocity phase state $X_2$;
  (b) the second segment has a length of zero; and
  (c) the σ processing block switches the switching logic from an operating mode for the first segment to an operating mode for the third segment when:

$X_2 \leq X_{2f}$; and $\sigma_1 \leq \sigma_3$; where $X_{2f}$=a predetermined maximum position error velocity;

$\sigma_1$=a phase state value relative to the first segment; and $\sigma_3$=a phase state value relative to the third segment.

31. The magnetic disk drive storage system as recited in claim 25, wherein:

(a) the two phase states comprise an actuator position error phase state $X_1$ and an actuator position error velocity phase state $X_2$;

(b) the sliding mode controller further comprises a reference velocity generator for generating an actuator reference velocity Vref subtracted from the position error velocity $X_2$ to generate a velocity error $X_v$;

(c) the $\sigma$ processing block switches the switching logic from an operating mode for the first segment to an operating mode for the second segment when:

$|X_2| \geq |X_{2f}|$; where $X_{2f}$=a predetermined maximum position error velocity;

(d) the trajectory segment logic switches the switching logic from an operating mode for the second segment to an operating mode for the third segment when:

$|Vref(k)| < |Vref(k-1)|$, (e) the $\sigma$ processing block switches the switching logic from an operating mode for the third segment to an operating mode for the fourth segment when:

$|X_1| \leq C$; where

C=a predetermined track acquire threshold.

32. The magnetic disk drive storage system as recited in claim 31, wherein:

(a) the second segment has a length of zero; and (b) the $\sigma$ processing block switches the switching logic from an operating mode for the first segment to an operating mode for the third segment when:

$X_1 * X_v < 0$; and $|X_2| \leq |X_{2f}|$; where $X_{2f}$=a predetermined maximum position error velocity.

33. The magnetic disk drive storage system as recited in claim 21, wherein the second segment has a length of zero.

34. The magnetic disk drive storage system as recited in claim 1, further comprising switching logic, responsive to the at least one phase state signal, for controlling the switching between the first and second structures.

35. The magnetic disk drive storage system as recited in claim 34, wherein the switching logic comprises a multiplier for multiplying a phase state value relative to the third phase plane trajectory by the at least one phase state signal to generate a product, wherein the switching logic switches to the first structure when the product is greater than zero and the switching logic switches to the second structure when the product is less than zero.

36. A closed loop servo control system for controlling the motion of a read/write head positioned over a rotating magnetic disk storage medium, the magnetic disk comprises a plurality of concentric data tracks recorded thereon comprising user data and servo data, a motor actuates the read/write head, the closed loop servo control system having a head position error phase state and a head position error velocity phase state, the closed loop servo control system comprising:

(a) an input connected to receive a selected head position;

(b) an adder for subtracting an estimated head position from the selected head position to generate a head position error signal; and (c) a sliding mode controller, responsive to the heed position error signal, for outputting a motor control signal to the motor in order to position the head over a selected track, wherein the sliding mode controller operates in a seek mode to move the read/write head from a current track to a selected track, and in a tracking mode to keep the read/write head substantially aligned over a centerline of the selected track while reading the user data and servo data;

wherein:

(a) the sliding mode controller switches between a first and a second structure;

(b) the first structure causes the two phase states to change relative to a phase plane to follow a first phase trajectory;

(c) the second structure causes the two phase states to change relative to the phase plane to follow a second phase trajectory;

(d) the first and second phase trajectories intersect in opposite directions in at least part of the phase plane;

(e) by switching between the first and second structures the sliding mode controller causes the two phase states to change relative to the phase plane to substantially follow a predetermined third phase trajectory; and (f) the third phase trajectory is within the part of the phase plane where the first and second phase trajectories intersect.

37. The closed loop servo control system as recited in claim 36, wherein:

(a) the servo data comprises track number information and servo bursts;

(b) the estimated head position is derived from the track number information when seeking the selected track; and (c) the estimated head position is derived from the servo bursts when tracking the centerline of the selected track.

38. A method for controlling the motion of a read/write head positioned over a rotating magnetic disk storage medium, the magnetic disk comprises a plurality of concentric data tracks recorded thereon comprising user data and servo data, a motor actuates the read/write head, the method comprising the steps of:

(a) generating at least one phase state signal representing a phase state of the motor;

(b) comparing the phase state signal to a phase state value relative to a predetermined phase trajectory;

(c) generating a motor control signal by multiplying the phase state signal by a first gain value in response to a first result of the comparison in step (b) and by multiplying the phase state signal by a second gain value in response to a second result of the comparison in step (b); and (d) applying the motor control signal to the motor to actuate the read/write head over the magnetic disk during a seek mode and during a tracking mode;

wherein:

(a) multiplying the phase state signal by the first gain value causes the phase state to change relative to a phase plane to follow a first phase trajectory;

(b) multiplying the phase state signal by the second gain value causes the phase state to change relative to the phase plane to follow a second phase trajectory;

(c) the first and second phase trajectories intersect in opposite directions in at least part of the phase plane;

(d) by switching between the first and second gain values the sliding mode controller causes the phase state to change relative to the phase plane to substantially follow a predetermined third phase trajectory; and (e) the third phase trajectory is within the part of the phase plane where the first and second phase trajectories intersect.

* * * * *